(12) United States Patent
Nguyen et al.

(10) Patent No.: US 11,692,424 B2
(45) Date of Patent: Jul. 4, 2023

(54) FLUID INJECTION TREATMENTS IN SUBTERRANEAN FORMATIONS STIMULATED USING PROPELLANTS

(71) Applicant: Halliburton Energy Services, Inc., Houston, TX (US)

(72) Inventors: Philip D. Nguyen, Houston, TX (US); Glenn A. Wilson, Houston, TX (US); Golchehreh Salamat, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 414 days.

(21) Appl. No.: 16/626,164

(22) PCT Filed: Nov. 8, 2017

(86) PCT No.: PCT/US2017/060631
§ 371 (c)(1),
(2) Date: Dec. 23, 2019

(87) PCT Pub. No.: WO2019/027489
PCT Pub. Date: Feb. 7, 2019

(65) Prior Publication Data
US 2021/0230991 A1 Jul. 29, 2021

(51) Int. Cl.
*E21B 43/263* (2006.01)
*E21B 43/26* (2006.01)
(Continued)

(52) U.S. Cl.
CPC .............. *E21B 43/263* (2013.01); *C09K 8/64* (2013.01); *C09K 8/72* (2013.01); *C09K 8/80* (2013.01);
(Continued)

(58) Field of Classification Search
CPC .. E21B 43/26; E21B 43/2605; E21B 43/2607; E21B 43/27; E21B 43/263;
(Continued)

(56) References Cited

U.S. PATENT DOCUMENTS

| 1,354,640 A | 10/1920 | Woodbridge, Jr. |
| 1,955,927 A | 4/1934 | McBride |

(Continued)

FOREIGN PATENT DOCUMENTS

| WO | 2008/027982 A2 | 3/2008 |
| WO | 2016/065478 A1 | 5/2016 |
| WO | 2016/074075 A1 | 5/2016 |

OTHER PUBLICATIONS

Cipolla, Craig L., et al. "The relationship between fracture complexity, reservoir properties, and fracture-treatment design." SPE production & Operations 25.04 (2010): 438-452.

(Continued)

*Primary Examiner* — Nicole Coy
*Assistant Examiner* — Nicholas D Wlodarski
(74) *Attorney, Agent, or Firm* — Kilpatrick Townsend & Stockton LLP

(57) ABSTRACT

Methods and systems for performing injection treatments in subterranean formations stimulated by the ignition of propellants are provided. In some embodiments, the methods comprise: igniting a propellant in one or more secondary boreholes in a subterranean formation to at least partially rupture at least a region of the subterranean formation near the secondary boreholes; introducing a fracturing fluid into a first production well bore in the subterranean formation in or near the ruptured region of the subterranean formation at or above a pressure sufficient to create or enhance at least a primary fracture in the subterranean formation that extends into at least a portion of the ruptured region of the subter- (Continued)

ranean formation; and introducing a displacement fluid into one or more of the secondary boreholes or an injection well bore in the subterranean formation that comprises one or more fractures penetrating the ruptured region of the subterranean formation.

19 Claims, 13 Drawing Sheets

(51) Int. Cl.
*E21B 43/1185* (2006.01)
*E21B 43/267* (2006.01)
*E21B 43/16* (2006.01)
*E21B 43/17* (2006.01)
*C09K 8/64* (2006.01)
*C09K 8/72* (2006.01)
*C09K 8/80* (2006.01)
*C09K 8/584* (2006.01)
*C09K 8/62* (2006.01)

(52) U.S. Cl.
CPC .......... *E21B 43/1185* (2013.01); *E21B 43/16* (2013.01); *E21B 43/17* (2013.01); *E21B 43/267* (2013.01); *E21B 43/2607* (2020.05); *C09K 8/584* (2013.01); *C09K 8/62* (2013.01)

(58) Field of Classification Search
CPC .... E21B 43/267; E21B 33/1208; E21B 43/11; E21B 43/1185; E21B 43/16; E21B 43/17
See application file for complete search history.

(56) References Cited

U.S. PATENT DOCUMENTS

| | | | |
|---|---|---|---|
| 2,771,035 A | 11/1956 | Clark | |
| 2,989,388 A | 6/1961 | Toulmin, Jr. | |
| 3,653,993 A | 4/1972 | Batchelder et al. | |
| 3,834,956 A | 9/1974 | Mellow et al. | |
| 4,374,545 A * | 2/1983 | Bullen | E21B 43/267 |
| | | | 166/177.5 |
| 4,971,160 A * | 11/1990 | Upchurch | E21B 43/1185 |
| | | | 175/4.54 |
| 5,149,384 A | 9/1992 | Marion | |
| 5,346,015 A | 9/1994 | Grundmann | |
| 5,734,124 A | 3/1998 | Bruenner et al. | |
| 6,361,629 B2 | 3/2002 | Mahaffy | |
| 6,623,574 B1 | 9/2003 | Wu | |
| 7,647,763 B2 | 1/2010 | Joshi et al. | |
| 7,887,650 B2 | 2/2011 | Kitayama et al. | |
| 7,942,990 B2 | 5/2011 | Kitayama et al. | |
| 7,958,823 B2 | 6/2011 | Sawka | |
| 8,033,021 B2 | 10/2011 | Joshi et al. | |
| 8,317,952 B2 | 11/2012 | Katzakian et al. | |
| 8,317,953 B2 | 11/2012 | Sawka et al. | |
| 8,469,110 B2 | 6/2013 | Sanders et al. | |
| 8,607,704 B2 | 12/2013 | Stark et al. | |
| 8,617,327 B1 | 12/2013 | Katzakian et al. | |
| 8,689,876 B2 | 4/2014 | Loree et al. | |
| 8,888,935 B2 | 11/2014 | Grix et al. | |
| 8,931,553 B2 | 1/2015 | Cannan et al. | |
| 9,027,641 B2 | 5/2015 | Alekseenko et al. | |
| 9,057,261 B2 | 6/2015 | Walters et al. | |
| 9,062,545 B2 | 6/2015 | Roberts et al. | |
| 9,080,441 B2 | 7/2015 | Meurer et al. | |
| 9,182,207 B2 | 11/2015 | McPherson et al. | |
| 9,243,182 B2 | 1/2016 | Lanctot-Downs et al. | |
| 9,328,034 B2 | 5/2016 | McPherson et al. | |
| 9,556,719 B1 | 1/2017 | Griffin | |
| 9,562,426 B2 | 2/2017 | Roberts et al. | |
| 2007/0215347 A1* | 9/2007 | Tang | C09K 8/74 |
| | | | 166/308.1 |
| 2010/0132946 A1* | 6/2010 | Bell | F42B 3/08 |
| | | | 166/298 |
| 2011/0192601 A1 | 8/2011 | Bahorich et al. | |
| 2012/0179444 A1 | 7/2012 | Ganguly et al. | |
| 2013/0000908 A1 | 1/2013 | Walters et al. | |
| 2013/0161007 A1 | 6/2013 | Wolfe et al. | |
| 2013/0284437 A1* | 10/2013 | Nguyen | E21B 43/267 |
| | | | 166/280.1 |
| 2013/0327529 A1 | 12/2013 | Sprouse | |
| 2013/0341029 A1 | 12/2013 | Roberts et al. | |
| 2014/0299318 A1 | 10/2014 | Crews et al. | |
| 2015/0007996 A1 | 1/2015 | Ayasse | |
| 2015/0021023 A1 | 1/2015 | Roberts et al. | |
| 2015/0129230 A1 | 5/2015 | Carlson et al. | |
| 2016/0053160 A1 | 2/2016 | Nguyen et al. | |
| 2016/0153271 A1 | 6/2016 | Mace et al. | |
| 2016/0230526 A1 | 8/2016 | Crews et al. | |
| 2016/0244659 A1 | 8/2016 | Shahin et al. | |

OTHER PUBLICATIONS

International Search Report and Written Opinion issued in related PCT Application No. PCT/US2017/060631 dated Apr. 12, 2018, 16 pages.
International Search Report and Written Opinion issued in related PCT Application No. PCT/US2017/045518 dated May 3, 2018, 18 pages.
CA. Application No. CA3068814 , Office Action, dated Jan. 14, 2022, 8 pages.
SA Application No. SA520410946, "Office Action", dated Feb. 10, 2022.

* cited by examiner

FLUID INJECTION TREATMENTS IN SUBTERRANEAN FORMATIONS STIMULATED USING PROPELLANTS

CROSS-REFERENCE TO RELATED APPLICATION

The present application is a U.S. National Stage Application of International Application No. PCT/US2017/060631 filed Nov. 8, 2017, which claims priority to and is a continuation-in-part of International Application No. PCT/US2017/045518 filed Aug. 4, 2017, both of which are incorporated herein by reference in their entirety for all purposes.

BACKGROUND

The present disclosure relates to systems and methods for performing injection treatments (e.g., sweeping or flooding treatments) in certain subterranean formations.

Wells in hydrocarbon-bearing subterranean formations are often stimulated to produce hydrocarbons using hydraulic fracturing treatments. In hydraulic fracturing treatments, a viscous fracturing fluid, which also may function as a carrier fluid, is pumped into a producing zone at a sufficiently high rate and/or pressure such that one or more fractures are formed in the zone. These fractures provide conductive channels through which fluids in the formation such as oil and gas may flow to a well bore for production. In order to maintain sufficient conductivity through the fracture, it is often desirable that the formation surfaces within the fracture or "fracture faces" be able to resist erosion and/or migration to prevent the fracture from narrowing or fully closing. Proppant particulates may be suspended in a portion of the fracturing fluid and deposited in the fractures when the fracturing fluid is converted to a thin fluid to be returned to the surface. These proppant particulates serve to prevent the fractures from fully closing so that conductive channels are formed through which produced hydrocarbons can flow.

In many current fracturing treatments performed in shale reservoirs, large amounts of water or other fluids (e.g., an average of 1 million gallons per fracturing stage) are often pumped at high rates in order to provide sufficient downhole treating pressure to form fractures in the formation of the desired geometries. Large amounts of proppant are also often used in these operations; however, those proppants must be sized carefully to prevent premature screenout during their placement into the fractures and efficiently prop open fractures in the well system. Further, the fluids carrying those proppants must have sufficient viscosity to carry those proppants to their desired locations or be injected at a higher rate to provide high fluid velocity to overcome settling of proppant and transport the particulates into the fractures. Providing the large amounts of pumping power, water, and proppants for these operations, and the disposal of water flowing back out of the formation after these hydraulic fracturing treatments, are often costly and time-consuming, and make fracturing operations uneconomical in many circumstances.

BRIEF DESCRIPTION OF THE DRAWINGS

These drawings illustrate certain aspects of some of the embodiments of the present disclosure, and should not be used to limit or define the claims.

Figure 1:
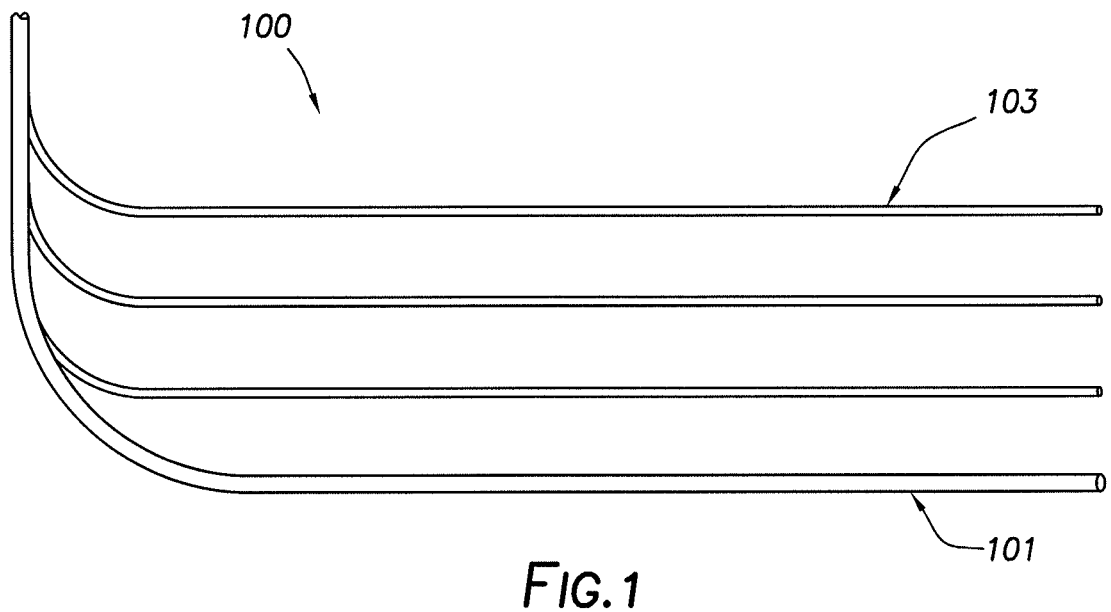
FIGS. 1-5 are diagrams illustrating a portion of a subterranean formation in which an operation is performed in accordance with certain embodiments of the present disclosure in which a displacement fluid is injected into lateral secondary boreholes.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to systems and methods for performing injection treatments (e.g., sweeping or flooding treatments) in certain subterranean formations. More particularly, the present disclosure relates to systems and methods for performing such treatments in subterranean formations that have been or will be stimulated by the ignition of propellants in the formation.

The present disclosure provides methods and systems using ignitable propellants to generate complex fracture networks in a region of a subterranean formation, particularly in tight formations, and then performing certain sweeping or flooding treatments in those regions. In accordance with the methods of the present disclosure, a main well bore (e.g., a production well bore) is drilled to penetrate at least a portion of a subterranean formation of interest, and optionally may be cased and/or otherwise completed. Either before or after the main well bore is drilled, one or more secondary boreholes are drilled in the subterranean formation in a region near the main well bore is or will be located. An ignitable propellant (e.g., an electrically controlled propellant) is introduced into the secondary boreholes. The propellant is then ignited to at least partially rupture a portion of the subterranean formation, which may form a complex fracture network comprised of secondary or tertiary fractures (e.g., cracks or fissures) therein. In certain methods of the present disclosure, these secondary and tertiary fractures can be connected to a primary fracture, which may be formed by isolating and perforating an area of interest in the main well bore, and introduction of a high viscosity fluid at or above a pressure sufficient to create or enhance at least one primary fracture within the subterranean formation. Connection of the primary fracture to the ruptured portion or complex fracture network in the subterranean formation may, among other benefits, enhance production of hydrocarbons from the formation. In certain embodiments, a displacement fluid may be injected into the secondary boreholes and/or a separate injection well drilled in or adjacent to the ruptured portion of the formation. In some embodiments, the displacement fluid may be injected shortly after a complex fracture network has been created. In other embodiments, the displacement fluid may be injected after hydrocarbons have been produced from the formation for some period of time. The injection of this fluid through the secondary boreholes may enhance the sweeping efficiency of hydrocarbons for production through the primary and secondary fractures and into a production well (e.g., the main well bore).

Among the many potential advantages to the methods and compositions of the present disclosure, only some of which are alluded to herein, the methods, compositions, and systems of the present disclosure may enhance the production of hydrocarbons from subterranean formations in a number of ways. For example, in some embodiments, the methods of the present disclosure may reduce or eliminate the use of large volumes of fluids (e.g., water) and/or proppants used in conventional fracturing treatments, and/or reduce the amount of pumping horsepower required to create complex fracturing geometries in subterranean shale formations. Reducing the amount of water used in fracturing operations may, among other benefits, reduce flowback volume and/or costs of disposing flowback water. Reducing or eliminating the amount of fracturing sand or other proppants used in fracturing operations may, among other benefits, simplify the composition of fracturing fluids that no longer need to suspend proppant particulates, reduce proppant settling issues, decrease the abrasion to well site equipment from pumping proppant slurries into the formation, reduce the amounts of water and/or sand transported to/from well site, and/or minimize the maintenance cost of pumping equipment.

In certain embodiments, the ignition of electrically controlled propellants used in the methods and systems of the present disclosure may be more effectively controlled as compared to other types of explosives or downhole energy sources. For example, these electrically controlled propellants may be less likely to spontaneously ignite, particularly at elevated pressure and/or temperature conditions experienced downhole. For these and other reasons, the methods and systems of the present disclosure may present fewer or less significant safety risks in their manufacturing, transportation, handling, and use than other methods and systems using other energy sources. Moreover, in some embodiments, it may be possible to cease the ignition of an electrically controlled propellant (e.g., by discontinuing the flow of electrical current therethrough), and then re-ignite the remaining portion of material at a subsequent time by re-applying electrical current to that same area. Consequently, in some embodiments, the methods and systems of the present disclosure may provide ways of fracturing or otherwise stimulating subterranean formations that can be used or actuated repeatedly without repeated interventions in the same well or placement of additional treatment fluids therein. Further, in some embodiments, the use of ignitable propellant to generate complex fracture networks in the secondary boreholes may protect the integrity of the main well bore, particularly where the main well bore is cased and/or otherwise completed before the propellant is used to rupture the subterranean formation at a distance from the main well bore.

In some embodiments, the use of sweeping and/or flooding treatments according to the present disclosure in subterranean formations stimulated by the ignition of propellants may further increase production from tight formations or formations where production rates have severely decreased, even after conventional stimulation treatments have been attempted. In some embodiments, such sweeping and/or flooding treatments also may promote the more even or uniform migration and/or production of hydrocarbon fluids across different regions in a subterranean formation (e.g., regions of differing permeabilities). For example, in some embodiments, a displacement fluid of the present disclosure may be injected specifically into certain regions of a subterranean formation that are less permeable or porous than other regions of the formation in order to increase the rate of production from that region, while allowing the other regions of the formation to produce at their existing rates.

The propellants used in the methods and systems of the present disclosure may comprise any ignitable or combustible substance known in the art. Common propellants are energetic materials and may comprise a combustible fuel and an oxidizer. Examples of propellant fuels that may be suitable for use in certain embodiments of the present disclosure may include, but are not limited to, gasoline, nitrocelluloses, asphalt, polyesters, polyalcohols, polynitroalkenes, polyacrylamides, polyoxymethylenes, guanadine compounds, triazine compounds, tetrazole compounds, nitroamine compounds, and any combination thereof. Examples of oxidizers that may be suitable for use in certain embodiments of the present disclosure may include, but are not limited to, metal salts (e.g., potassium perchlorate), hydrazine, ammonium salts, nitrates, and any combination thereof. In some embodiments, the propellant may comprise an electrically controlled propellant, which may comprise any substance known in the art that can be ignited by passing an electrical current through the propellant.

In certain embodiments, the propellant may comprise a binder (e.g., polyvinyl alcohol, polyvinylamine nitrate, polyethanolaminobutyne nitrate, polyethyleneimine nitrate, copolymers thereof, and mixtures thereof), an oxidizer (e.g., ammonium nitrate, hydroxylamine nitrate, and mixtures thereof), and a crosslinking agent (e.g., boric acid). Such propellant compositions may further comprise additional optional additives, including but not limited to stability enhancing or combustion modifying agents (e.g., 5-aminotetrazole or a metal complex thereof), dipyridyl complexing agents, polyethylene glycol polymers, and the like. In certain embodiments, the propellant may comprise a polyalkylammonium binder, an oxidizer, and a eutectic material that maintains the oxidizer in a liquid form at the process temperature (e.g., energetic materials such as ethanolamine nitrate (ETAN), ethylene diamine dinitrate (EDDN), or other alkylamines or alkoxylamine nitrates, or mixtures thereof). Such propellants may further comprise a mobile phase comprising at least one ionic liquid (e.g., an organic liquid such as N,n-butylpyridinium nitrate). Certain of the aforementioned propellants may be commercially available from Digital Solid State Propulsion, Inc. of Reno, Nev.

The propellant may be provided as a liquid, or as a solid or semi-solid (e.g., powders, pellets, nanoparticles, etc.) dissolved, dispersed, or suspended in a carrier liquid. In some embodiments, a liquid form of propellant may be particularly suited to penetrating smaller cracks, microfractures, and/or bedding planes in a formation, among other reasons, to more effectively place the electrically controlled propellant in those areas. In some embodiments, the liquid propellant, or a mixture of a liquid propellant and a solid propellant, is stored in a combustible container, bag, or hose, while it is being placed in the secondary borehole. In some embodiments, the combustible container, bag, or hose could be made of metal. In some embodiments, a detonation cord could be attached to the combustible container, bag, or hose to allow for efficient ignition of an electrically controlled propellant. In some embodiments, propellants provided in solid form may be used in lieu of or in combination with other proppant materials to prop open small cracks, fractures, or bedding planes in the formation (e.g., in the far well bore region of the formation) when the fracturing fluid pressure is released. In some embodiments, the propellant may be provided in a composition that comprises a mixture of one or more propellants and other materials, including but not limited to inert materials such as sand, cement, fly ash, fiberglass, ceramic materials, carbon fibers, polymeric materials, clay, acid soluble materials, degradable materials (e.g., polylactic acid), and the like.

As noted above, an electrical current must be applied to an electrically controlled propellant to ignite it in the methods of the present disclosure where such propellants are used. That electrical current may be transmitted or otherwise provided to the electrically controlled propellant in the formation using any means known in the art. In some embodiments, electrical current is provided from a direct current (DC) source, although electrical power from alternating current (AC) sources can be used as well. In some embodiments, the source of electrical current may be provided at the surface, and the current may be transferred via a conductive wire, cable, and/or tubing into the subterranean formation to the electrically controlled propellant and/or another electrically conductive material in contact with the propellant. In these embodiments, the electrical current may pass through any number of secondary relays, switches, conduits (e.g., wires or cables), electrodes, equipment made of conductive material (e.g., metal casings, liners, etc.) or other electrically conductive structures. In other embodiments, the electrical current also may be provided by some other downhole energy source (such as downhole charges, hydraulic power generators, batteries, or the like), and then applied to the electrically controlled propellant in the formation. In certain embodiments, the amount of electrical current applied to ignite the electrically controlled propellant may range from about 1 milliamp to about 100 milliamps. In certain embodiments, the electrical current applied to ignite the electrically controlled propellant may have a corresponding voltage of from about 10 V to about 600 V.

The electrically controlled propellant may be ignited at any time, and the application of electrical current to the propellant may be triggered in any known way. In some embodiments, the current may be applied in response to manual input by an operator, either at the surface of the well site or from a remote location. In other embodiments, the current may be applied automatically in response to the detection of certain conditions in the formation using one or more downhole sensors. Examples of downhole sensors that may be used in this way include, but are not limited to, pressure sensors, temperature sensors, water sensors, motion sensors, chemical sensors, and the like.

In some embodiments, the electrical current may be applied to the electrically controlled propellant substantially continuously until substantially all of the propellant has been ignited or the desired fracture geometries have been created in the formation. In other embodiments, the electrical current may be applied to the electrically controlled propellant intermittently. The intermittent ignition of the propellant may generate a series of shorter pulses of energy and/or pressure in the area of the formation proximate to the secondary boreholes. The cracks and fractures in the formation may be permitted to relax or constrict between these intermittent pulses, which may facilitate the creation of more complex fracture geometries and/or more conductive fractures.

In some embodiments, the electrical current may be applied intermittently at a frequency that is equal to or approximates a resonant frequency of the region in the subterranean formation near the main well bore in order to throttle the burning rate of the electrically controlled propellant. Applying the electrical current at a frequency equal to or approximates the resonant frequency of the region in the subterranean formation near the main well bore may help to maximize the fracturing efficiency of the electrically controlled propellant. In other embodiments, the intermittent detonation of the electrically controlled propellant may be timed between two or more lateral boreholes in order to achieve a pulsing effect. The pulsing effect may be equal to or approximate the resonant frequency of the region in the subterranean formation near the main well bore and help to maximize the fracturing efficiency of the electrically controlled propellant.

An example of a fracture network created and/or enhanced according to certain methods of the present disclosure is illustrated in FIGS. 1-5. Referring now to FIG. 1, a main well bore 101 is shown penetrating a portion of a subterranean formation 100. In some embodiments, the main well bore 101 may have been at least partially cased and/or cemented during or prior to the remaining portions of the operation. The portion of the well bore 101 shown in FIGS. 1-5 is oriented horizontally, although a person of skill in the art with the benefit of this disclosure will recognize that the methods of the present disclosure could be similarly applied to sections of a well bore that are vertical or deviated from vertical to a lesser degree.

At least one secondary lateral borehole 103 has been drilled near the main well bore 101. The secondary boreholes 103 shown in FIGS. 1-5 are drilled at a depth closer to the surface than the main well bore, although a person of skill in the art with the benefit of this disclosure will recognize that the methods of the present disclosure could similarly be applied to secondary boreholes drilled at a greater depth than the main well bore, or around the same depth as the main well bore. In some embodiments, the secondary boreholes are drilled substantially parallel to the main well bore. In some embodiments, the secondary boreholes 103 will be spaced at least 25 feet away from the main well bore 101, among other reasons, to protect the integrity of the main well bore 101. The secondary boreholes 103 shown in FIGS. 1-5 are oriented horizontally, although a person of skill in the art with the benefit of this disclosure will recognize that the methods of the present disclosure could be similarly applied to sections of a well bore that are vertical or deviated from vertical to a lesser degree, in which the secondary boreholes would also be vertical or deviated from vertical to a lesser degree. Additionally, the secondary boreholes 103 shown in FIGS. 1-5 have been drilled off of the main well bore 101, although, a person of skill in the art with the benefit of this disclosure will recognize that the secondary boreholes could also be drilled off of another well bore that penetrates the subterranean formation. Further, multiple secondary boreholes 103 are shown in FIGS. 1-5, although a person of skill in the art with the benefit of this disclosure will recognize that more secondary boreholes or fewer secondary boreholes (e.g., as few as one secondary borehole) could be used in some embodiments.

In some embodiments, the secondary boreholes 103 can be drilled using coiled tubing. Coiled tubing could be coupled with a drill bit or a hydrojetting tool to drill and generate the lateral boreholes. The coiled tubing coupled with a hydrojetting tool could also be used to create slots or fractures along the lateral borehole, such that the propellant could be placed deeper inside the formation.

Figure 2:
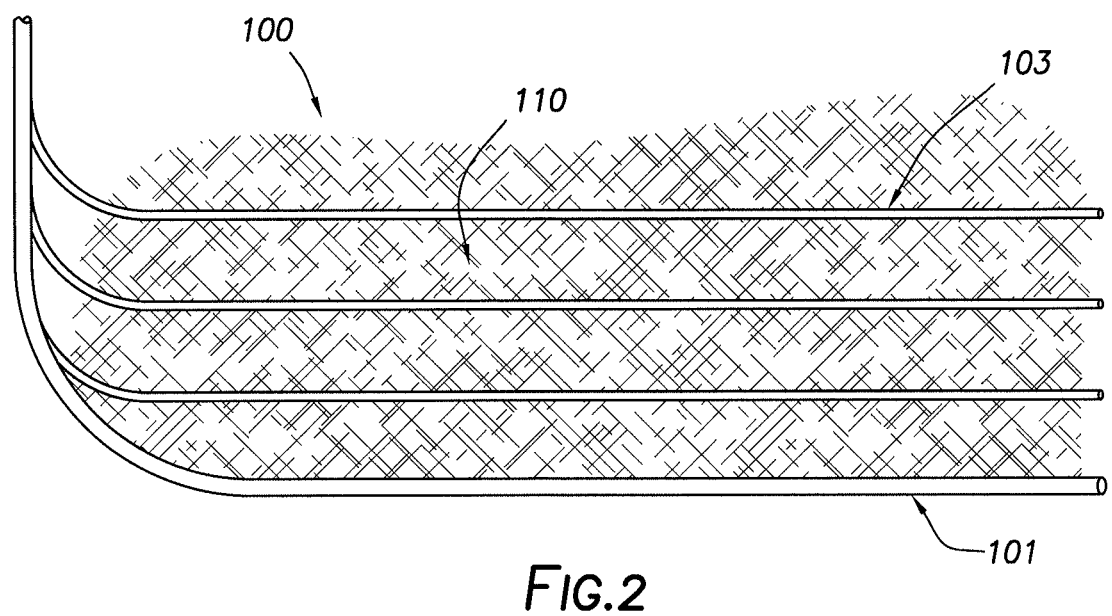

A propellant is introduced into the secondary boreholes 103. In some embodiments, the propellant is introduced into the secondary boreholes 103 while the coiled tubing is removed from (e.g., tripped out of) the secondary borehole 103. The propellant can be ignited within the secondary borehole 103. The ignition of the propellant at least partially ruptures a portion of the subterranean formation 100 and may cause rubblization of the subterranean formation adjacent the borehole, breaking of the fabric structure of the subterranean formation matrix, weakening of the bedding planes to cause tensile and shear failures, or a combination thereof. In any event, the ignition of the propellant generates a complex fracture network 110 comprised of numerous secondary and tertiary fractures, cracks, and micro-fractures throughout the subterranean formation adjacent to the secondary boreholes 103, as shown in FIG. 2.

In some embodiments, the ignition of the propellant may generate or break off small fragments of the formation that may become deposited within the cracks and fractures in the formation and act as in-situ proppant therein. Creation of in-situ proppant may help to hold the fractures of the complex fracture network 110 open and facilitate production of hydrocarbons from the subterranean formation.

Figure 3:
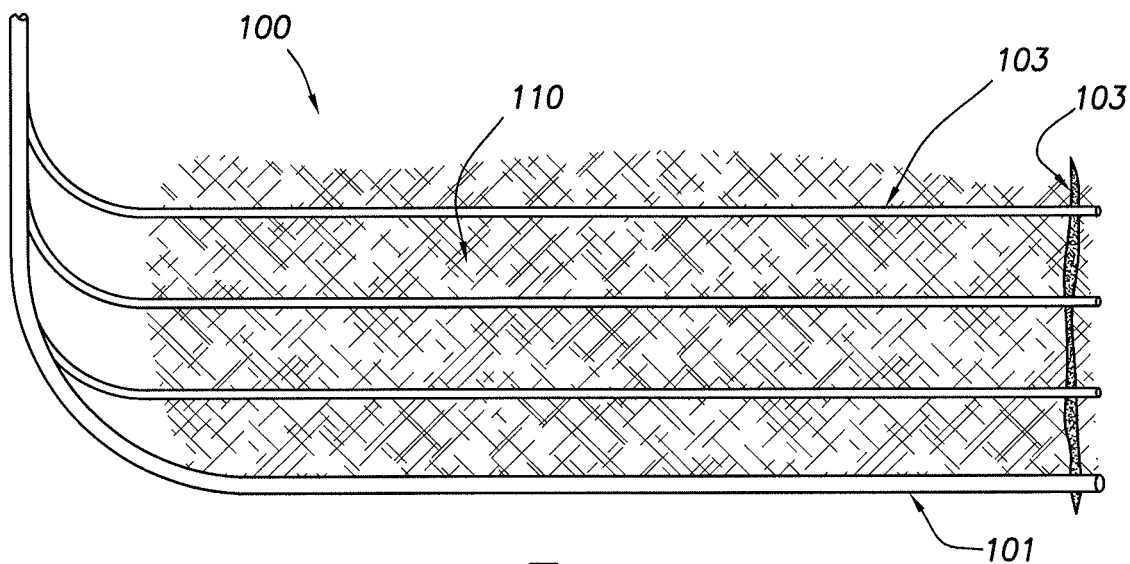

Referring now to FIG. 3, a primary fracture 120 is formed to extend from the main well bore 101. The primary fracture 120 may have been created by introducing a fracturing fluid into the main well bore 101 at or above a pressure sufficient to create or enlarge the fracture 120. Perforations can be formed in the casing to allow fracturing fluids and/or other materials to flow into the subterranean formation 100. Perforations can be formed using any known means, including shape charges, a perforating gun, and hydro jetting and/or other tools (e.g., StimGun™). The portion of the well bore 101 proximate to the portion of the subterranean formation 100 to be fractured also may be isolated using any known method of zonal isolation, including but not limited to packers, plugs, sand, gels, sleeves, valves, and the like. In some embodiments, after isolating and perforating an area of interest, a fracturing fluid (e.g., a high viscosity fluid) is introduced at or above a pressure sufficient to create or enhance at least one primary fracture in the subterranean formation. In some embodiments, the high viscosity fluid has a fluid viscosity of about 100 cP or higher, up to about 5,000 cP.

In some embodiments, the complex fracture network 110 created by ignition of the propellant can be connected to the primary fracture 120. Connection of the complex fracture network 110 to the primary fracture 120 may facilitate production of the hydrocarbons from the subterranean formation into the main well bore 101 while maintaining the integrity of the main well bore 101.

In some embodiments, a first low viscosity fluid is introduced into the main well bore 101 after creation of the primary fracture at or above a pressure sufficient to create or enhance at least one secondary fracture in the subterranean formation. In some embodiments, the low viscosity fluid has a fluid viscosity of about 25 cP or lower. The first low viscosity fluid may carry microproppant. In some embodiments of the present disclosure, the microproppant can include any particle having a mean particle size of up to about 100 μm. Microproppant materials that may be suitable for use include, but are not limited to, silica, fly ash, ceramic particles, iron oxide particles, carbon tubes, cellulose fibers, glass particles, glass fibers, composite particles, and thermoplastic particles. Introduction of the first low viscosity fluid with microproppant may extend the primary fracture 120 and/or place the microproppant particles in the induced microfractures or fissures of the complex fracture network 110 to keep them open. In some embodiments, the fracturing fluid and/or the first low viscosity fluid further comprises one or more chelating agents, acids, or delayed, in-situ acid generators. These agents may produce one or more acids in the formation, which may dissolve or otherwise interact with rock in the formation to increase its porosity and/or conductivity, which may enhance the connectivity between the complex fracture network 110 and the larger fracture branches and the primary fracture 120.

In some embodiments, following the introduction of the first low viscosity fluid, a second low viscosity fluid is introduced into the main well bore 101 at or above a pressure sufficient to create or enhance at least one fracture in the subterranean formation. The second low viscosity fluid may carry proppant. Proppant materials that may be suitable for use include, but are not limited to, natural sands, resin-coated sands, curable resin-coated proppants, gravels, synthetic organic particles, nylon pellets, high density plastics, composite polymers, polytetrafluoroethylenes, rubbers, resins, ceramics, fly ash, aluminosilicates, glass, sintered bauxite, quartz, aluminum pellets, metal shots, ground or crushed shells of nuts, walnuts, pecans, almonds, ivory nuts, brazil nuts, or any combinations thereof. In some embodiments, the second low viscosity fluid can comprise a gradual increase in mesh sizes (e.g., 200-mesh to 100-mesh to 40/70-mesh to 30/50 mesh) and concentrations of proppant (e.g., 0.5 lbm/gal to 1 lbm/gal to 2 lbm/gal) to place the proppant in the primary fracture and large fracture branches.

In some embodiments, a large volume of the high viscosity fluid is introduced into the main well bore 101, followed by intermittent or alternating introductions of a small volume of the first low viscosity fluid containing microproppant. In this embodiment, introduction of the high viscosity fluid may extend the length and height of the primary fracture, while introduction of the low viscosity fluid may induce the development of secondary fractures along the primary fracture and allow for placement of microproppant in the microfractures.

Figure 4:
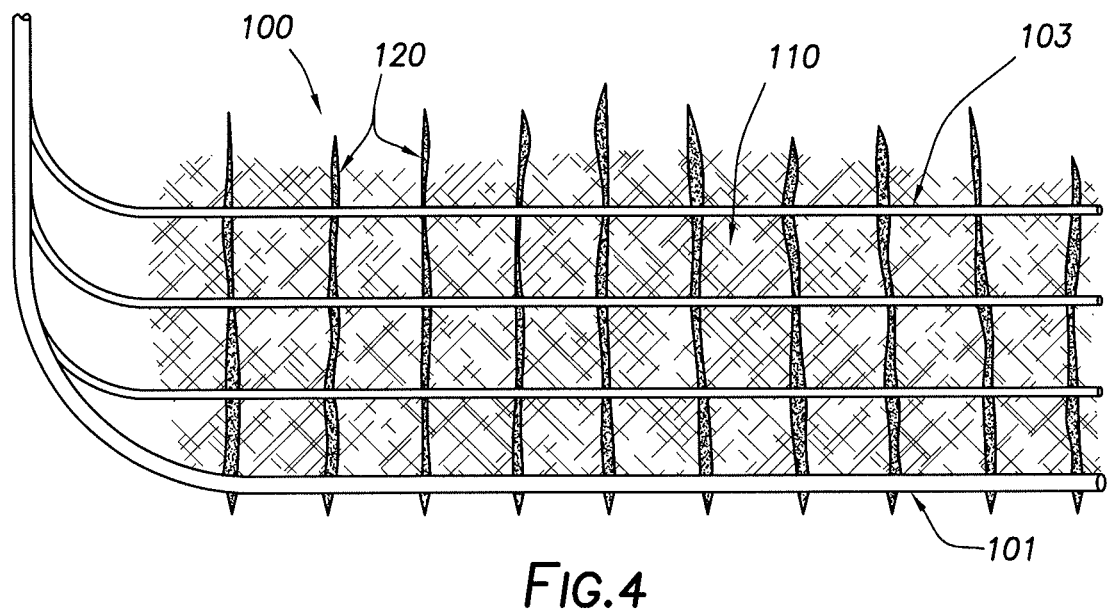

In some embodiments, as shown in FIG. 4, multiple primary fractures 120 are created by repeating the isolating and fracturing sequence described above for multiple intervals along the main well bore. In some embodiments, the one or more intervals start from the toe or far end of the main well bore, thereby providing effective production of hydrocarbons from the formation.

Figure 5:
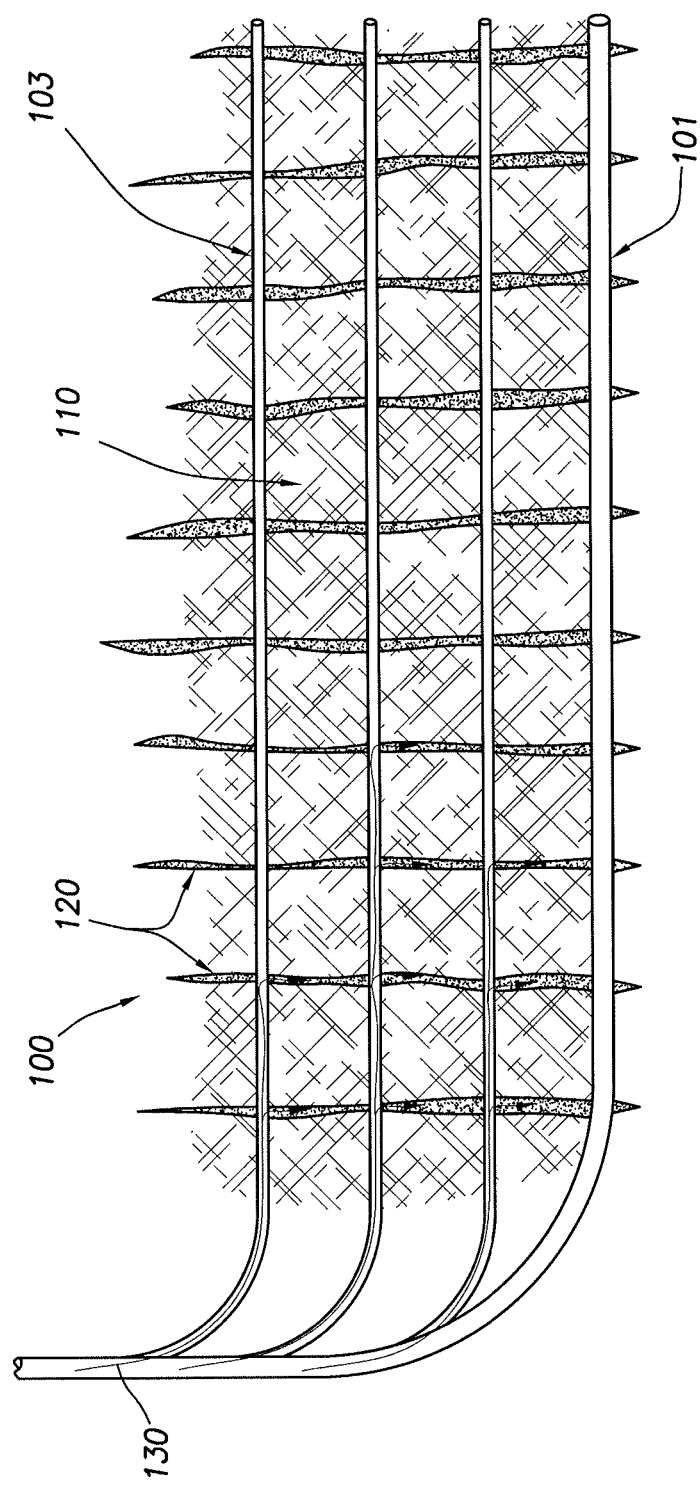

Referring now to FIG. 5, a displacement fluid 130 may be injected into the secondary boreholes 103 to facilitate movement of fluids present in the subterranean formation in a number of different ways. In some embodiments, the displacement fluid 130 may physically displace the fluids from one area in the formation to another. In some embodiments, the displacement fluid 130 may create pressure gradients (including gravity drainage) within the complex fracture network 110 that mobilizes fluids in that region of the formation such as oil, gas, water, and the like and encourage their flow into the main well bore 101. The displacement fluid 130 may be injected at any rate sufficient to displace fluids in the matrix of the formation substantially evenly across the ruptured region of the formation. The displacement fluid 130 may be injected at any time after the primary fractures 120 have been created. In some embodiments, fluids such as hydrocarbon-bearing fluids (e.g., oil or gas) may have been produced out of the main well bore 101 for some period of time, and the displacement fluid 130 may be injected into the boreholes 103 at some point after the production of oil or gas has slowed or ceased. Thus, the injection of the displacement fluid may increase production of oil or gas from an already-producing well.

Figure 6:
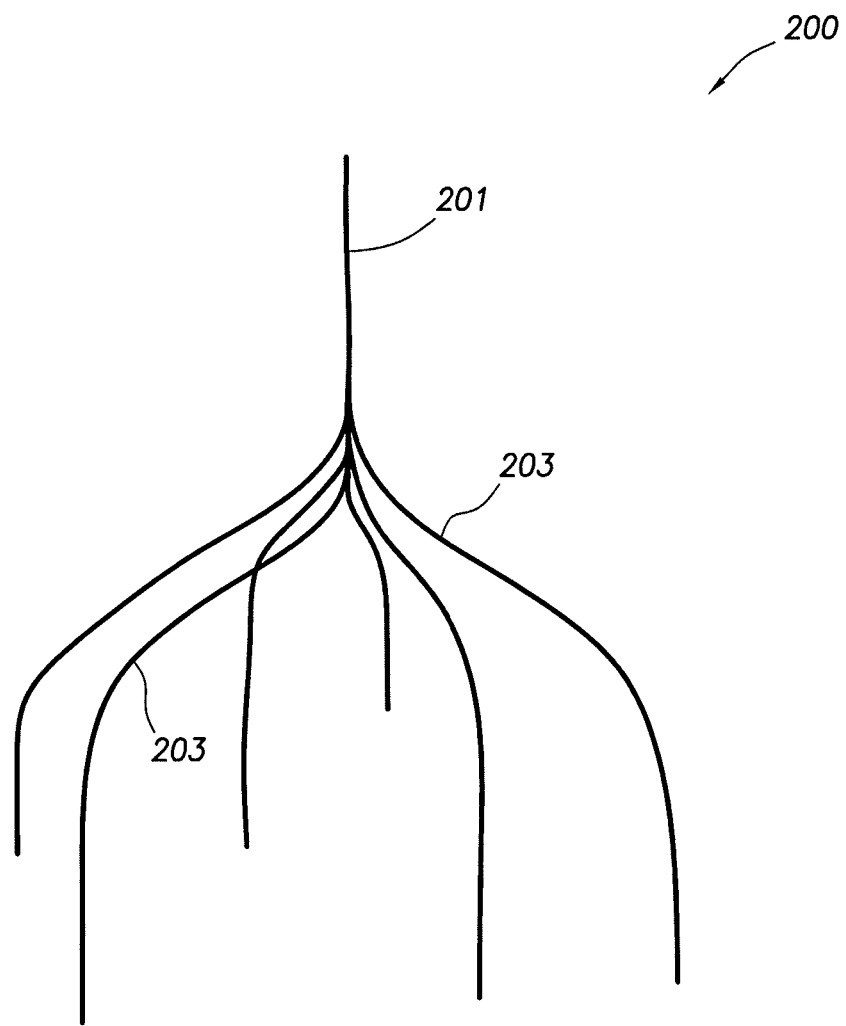
FIGS. 6-11 are diagrams illustrating a portion of another subterranean formation in which an operation is performed in accordance with certain embodiments of the present disclosure in which a displacement fluid is injected into vertical secondary boreholes.

Another example of a fracture network created and/or enhanced according to certain methods of the present disclosure is illustrated in FIGS. 6-11. Referring now to FIG. 6, a main borehole 201 is drilled to penetrate a portion of a subterranean formation 200, and a plurality of secondary boreholes 203 are drilled to branch off of from the main borehole 201 in a lateral direction and then further vertically penetrate the subterranean formation 200. In some embodiments, the main borehole 201 may have been at least partially cased and/or cemented during or prior to the remaining portions of the operation. The secondary boreholes 203 may be drilled using equipment and/or techniques similar to those discussed above with regard to the secondary boreholes of FIGS. 1-5. However, unlike the secondary boreholes shown in FIGS. 1-5, the main borehole 201 and the portions of secondary boreholes 203 extending into the formation 200 are generally oriented vertically. In some embodiments, the secondary boreholes are drilled in a direction substantially parallel to that of the main well bore. Additionally, although the secondary boreholes 203 shown in FIGS. 6-12 have been drilled off of the main borehole 201, a person of skill in the art with the benefit of this disclosure will recognize that the secondary boreholes could also be drilled separately from the surface to penetrate the same region of the subterranean formation. Further, multiple secondary boreholes 203 are shown in FIGS. 6-12, although a person of skill in the art with the benefit of this disclosure will recognize that more secondary boreholes or fewer secondary boreholes (e.g., as few as one secondary borehole) could be used in some embodiments.

Figure 7:
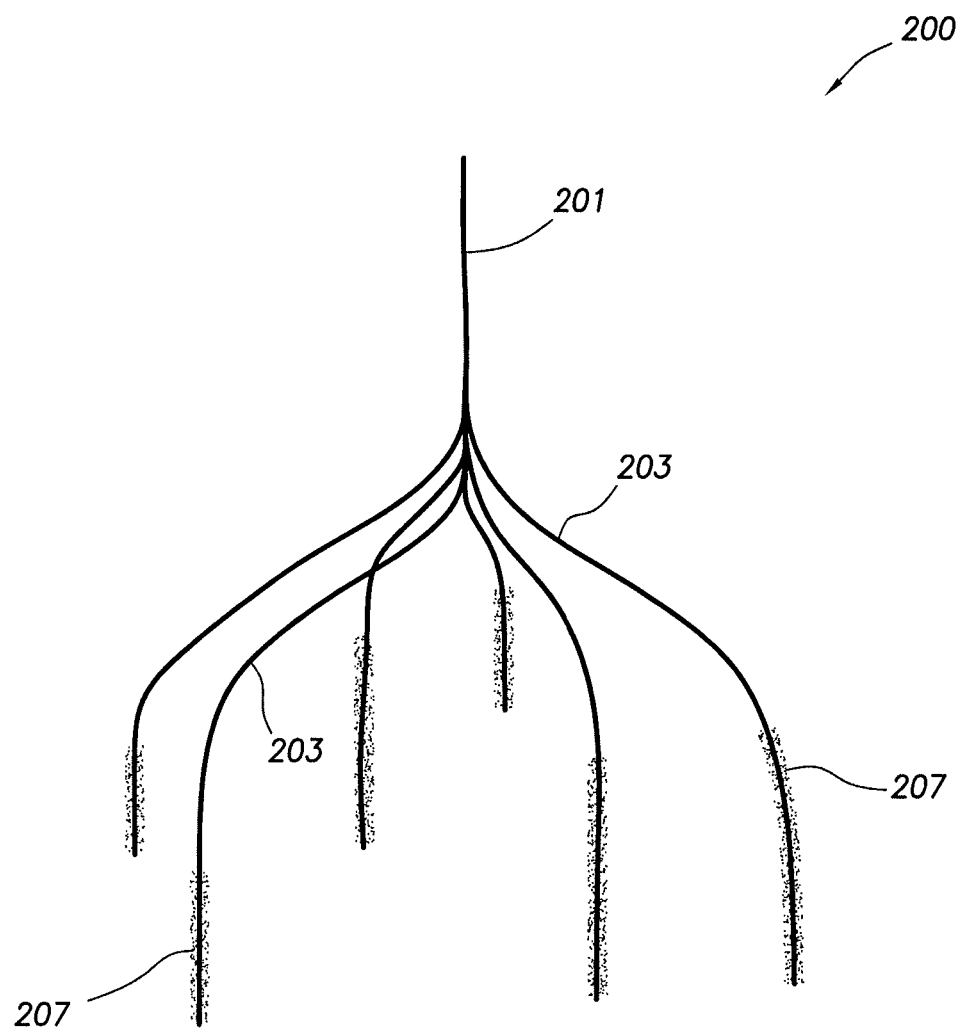
Figure 8:
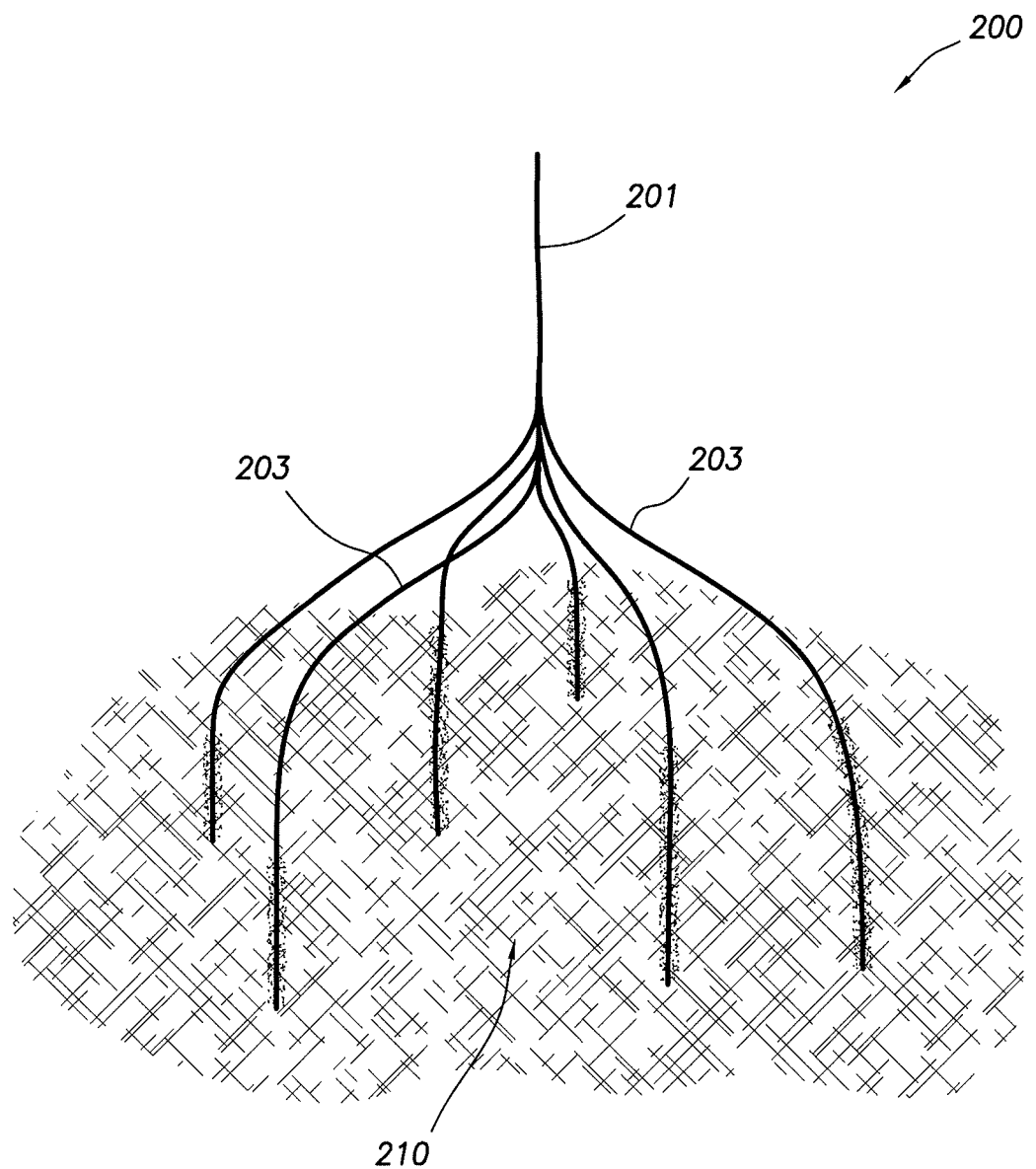

As shown in FIG. 7, a propellant 207 may be introduced into the secondary boreholes 203 using equipment and/or techniques similar to those described above for FIGS. 1-5, and similarly ignited. The ignition of the propellant at least partially ruptures a portion of the subterranean formation 200 and may cause rubblization of the subterranean formation adjacent the borehole, breaking of the fabric structure of the subterranean formation matrix, weakening of the bedding planes to cause tensile and shear failures, or a combination thereof. In an example, the ignition of the propellant can occur along a circumference of the borehole. In any event, the ignition of the propellant generates a complex fracture network 210 comprised of numerous secondary and tertiary fractures, cracks, and micro-fractures throughout the subterranean formation adjacent to the secondary boreholes 203, as shown in FIG. 8. In some embodiments, the ignition of the propellant may generate or break off small fragments of the formation that may become deposited within the cracks and fractures in the formation and act as in-situ proppant therein. Creation of in-situ proppant may help to hold the fractures of the complex fracture network 210 open and facilitate production of hydrocarbons from the subterranean formation.

Figure 9:
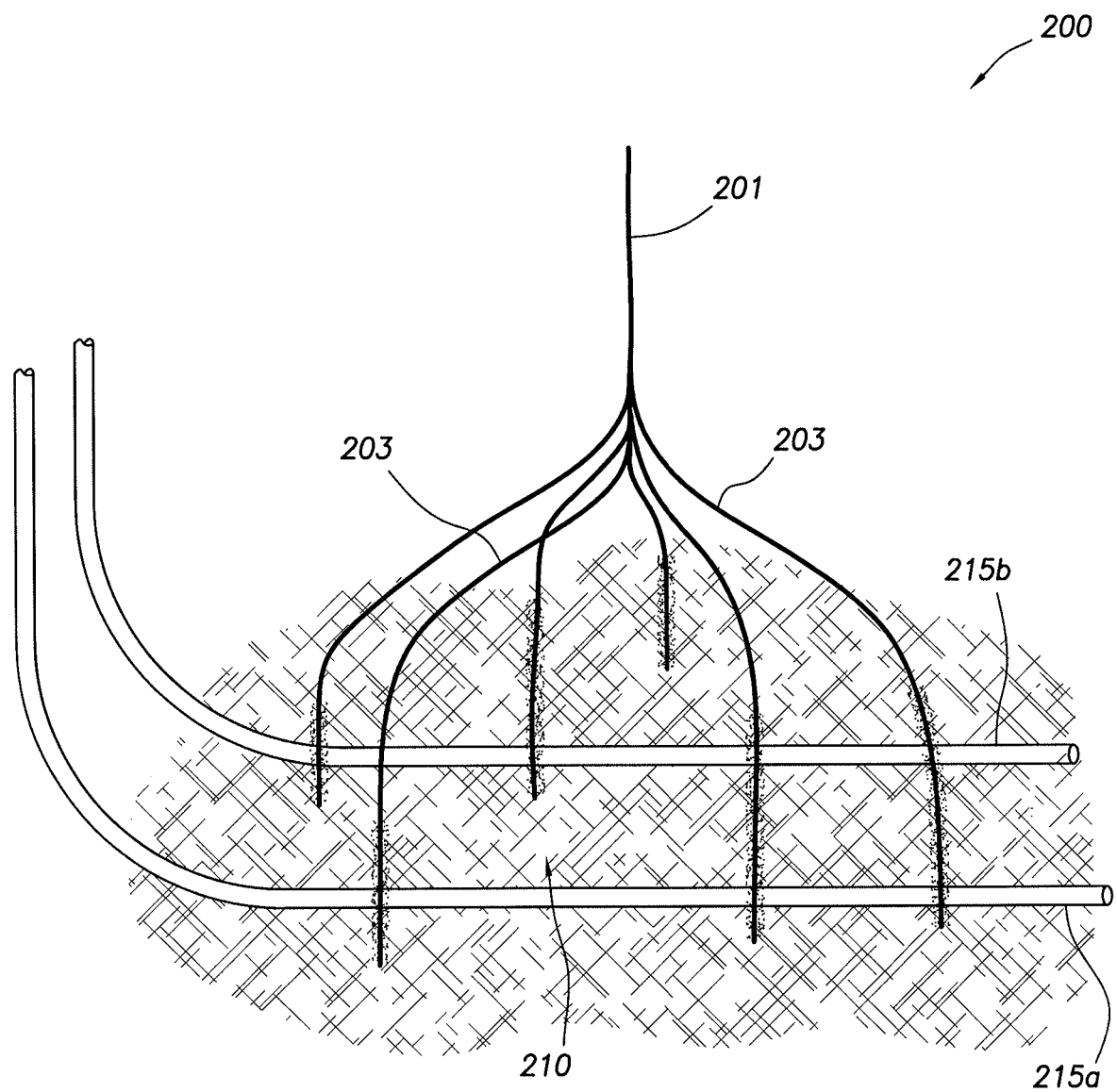

Referring now to FIG. 9, one or more production well bores 215a and 215b may be drilled to penetrate the complex fracture network 210. As shown, the production well bores 215a and 215b are drilled vertically initially and then extend laterally into the complex fracture network 210. In some embodiments, production well bores 215a and 215b may be at least partially cased and/or cemented during or prior to the remaining portions of the operation. Moreover, while FIG. 9 shows two production wells being drilled, a person of skill in the art with the benefit of this disclosure will recognize that as few as one production well may be drilled, or many other production wells may be drilled, to penetrate the complex fracture network, and those wells may be drilled to any suitable depths and/or in any suitable directions.

Figure 10:
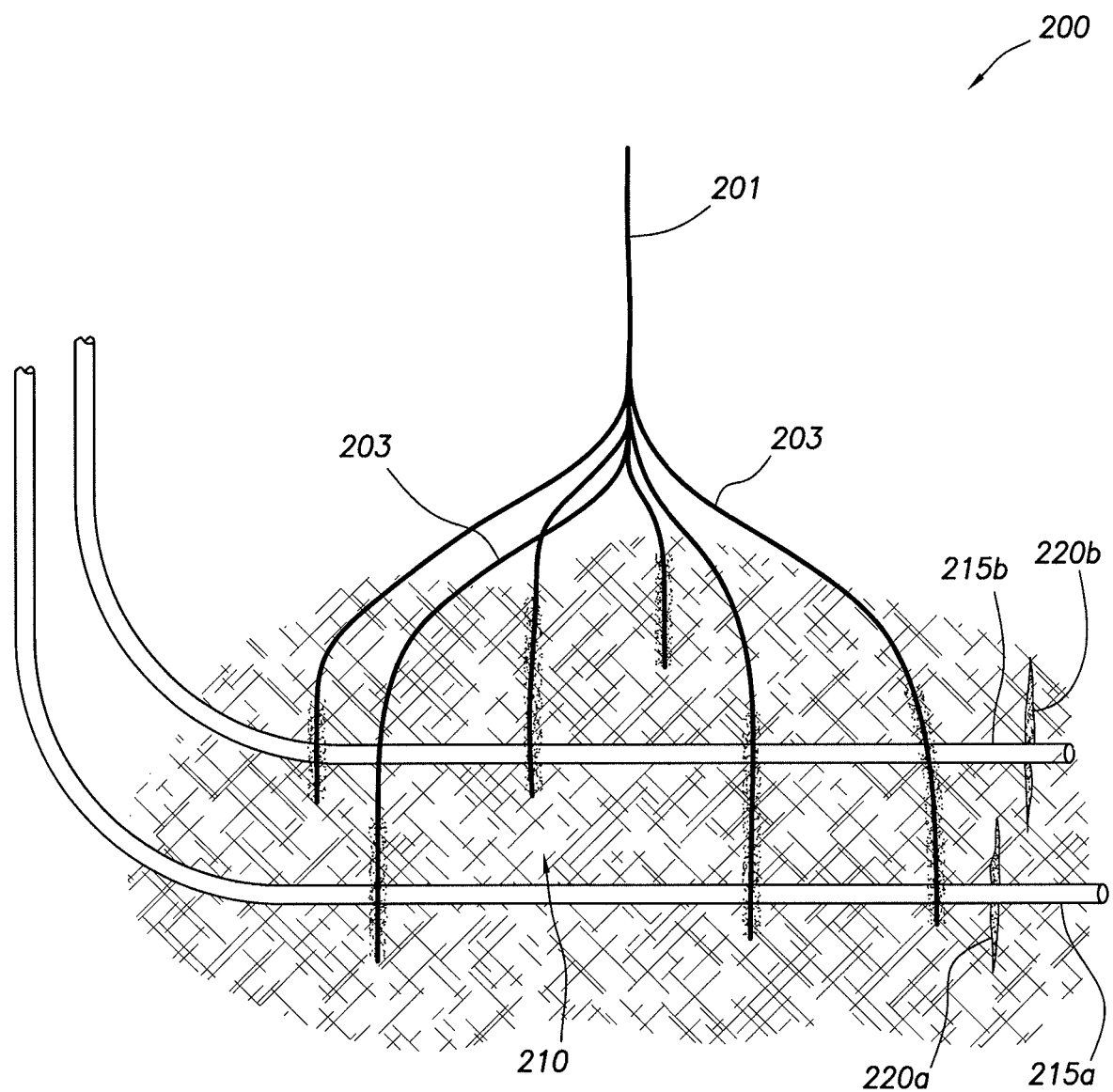
Figure 11:
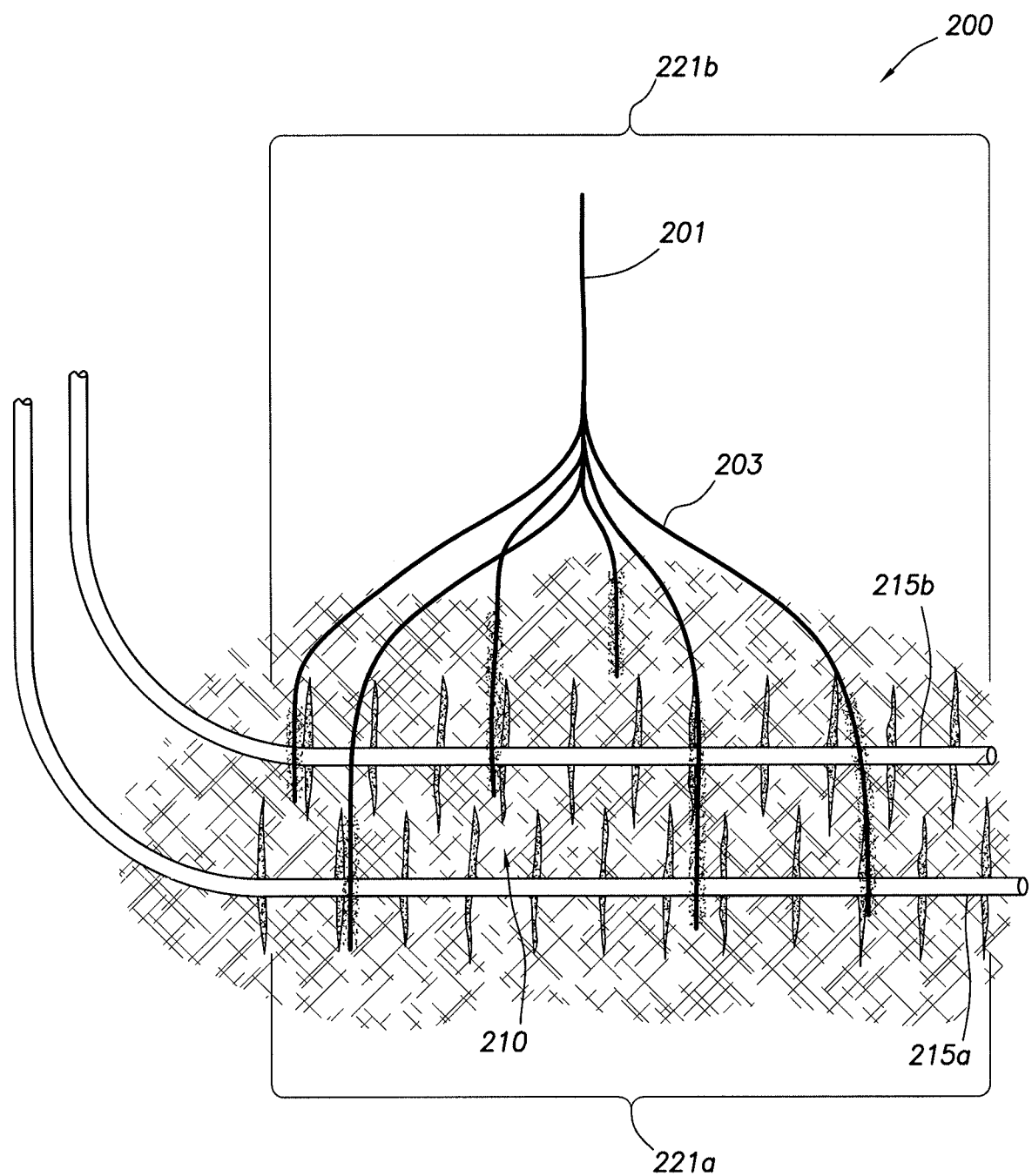

As shown in FIG. 10, primary fractures 220a and 220b are formed to extend from each of production well bores 215a and 215b. The primary fractures 220a and 220b may have been created by introducing a fracturing fluid into production well bores 215a and 215b at or above a pressure sufficient to create or enlarge the fractures 220a and 220b. Perforations can be formed in the casing in the well bore to allow fracturing fluids and/or other materials to flow into or out of the subterranean formation 200. In some embodiments, the complex fracture network 210 created by ignition of the propellant can be connected to the primary fractures 220a and 220b. Connection of the complex fracture network 210 to the primary fractures 220a and 220b may facilitate production of the hydrocarbons from the subterranean formation into the production well bores 215a and 215b while maintaining their integrity. As shown in FIG. 11, a set of multiple primary fractures 221a and 221b may be created in each of the production well bores 215a and 215b by repeating the isolating and fracturing sequence described above for multiple intervals along the well bore. In some embodiments, the one or more intervals start from the toe or far end of the well bore, thereby providing effective production of hydrocarbons from the formation. In some embodiments, the primary fractures in adjacent production well bores such as those shown may be formed using a "zipper frac" technique whereby the adjacent wells are fractured in an alternating sequence, for example, enabling production well bore 215a to hold fracture pressure while a primary fracture in production well bore 215b is formed, and then switching back to form another fracture in production well bore 215a, and so on. By using this technique, the fractures in adjacent well bores may avoid each other because of the stress pattern set up in the pressured well, and may maximize the exposure of new rock in the formation. This technique also may facilitate the more efficient use of fracturing and plug-and-perf equipment at the well bore since it can be rotated between or among the adjacent wells and thus can be used substantially continuously.

In some embodiments, fluids of high and low viscosities and fluids carrying proppant and/or microproppant materials or chelating agents, acids, or delayed, in-situ acid generators may be used in the fracturing processes illustrated in FIGS. 10 and 11 in a manner similar to that described above with regard to FIGS. 1-5, for similar purposes and to produce similar results. In some embodiments, the portion of the production well bores 215a and 215b proximate to the portion of the subterranean formation 200 to be fractured also may be isolated using any known method of zonal isolation. In some embodiments, a large volume of the high viscosity fluid is introduced into the production well bores 215a and 215b, followed by intermittent or alternating introductions of a small volume of the first low viscosity fluid containing microproppant. In this embodiment, introduction of the high viscosity fluid may extend the length and height of the primary fracture, while introduction of the low viscosity fluid may induce the development of secondary fractures along the primary fracture and allow for placement of microproppant in the microfractures.

Referring back to FIG. 11, once the primary fractures have been created, a displacement fluid (not shown) may be injected into the borehole 201 such that it flows into the secondary boreholes 203 and into the formation 200. The displacement fluid may create pressure gradients (including gravity drainage) within the complex fracture network 210 that mobilizes fluids in that region of the formation such as oil, gas, water, and the like and encourages their flow into the production well bores 215a and 215b. The displacement fluid may be injected at any rate sufficient to displace fluids in the matrix of the formation substantially evenly across the ruptured region of the formation. The displacement fluid may be injected at any time after the primary fractures 221a and 221b have been created. In some embodiments, fluids such as oil or gas may have been produced out of the production well bores 215a and 215b for some period of time, and the displacement fluid may be injected into the secondary boreholes 203 at some point after the production of oil or gas has slowed or ceased. Thus, the injection of the displacement fluid may increase production of oil or gas from an already-producing well.

Figure 12:
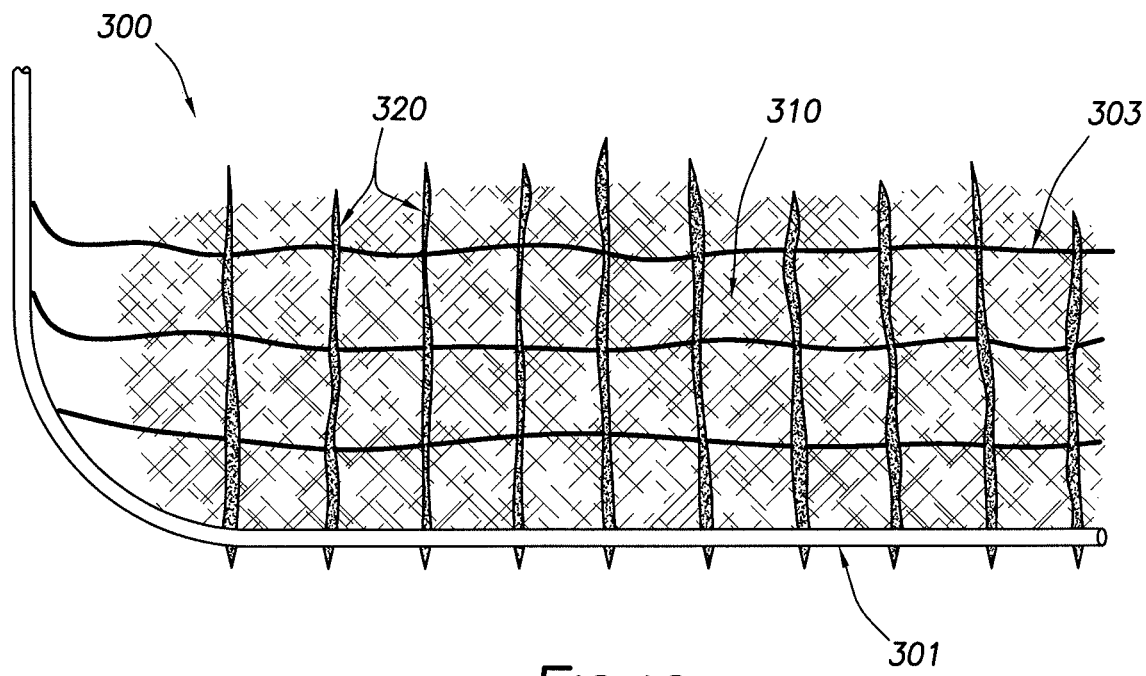
FIGS. 12-15 are diagrams illustrating a portion of a subterranean formation in which an operation is performed in accordance with certain embodiments of the present disclosure in which a displacement fluid is injected into a separate injection well.
Figure 13:
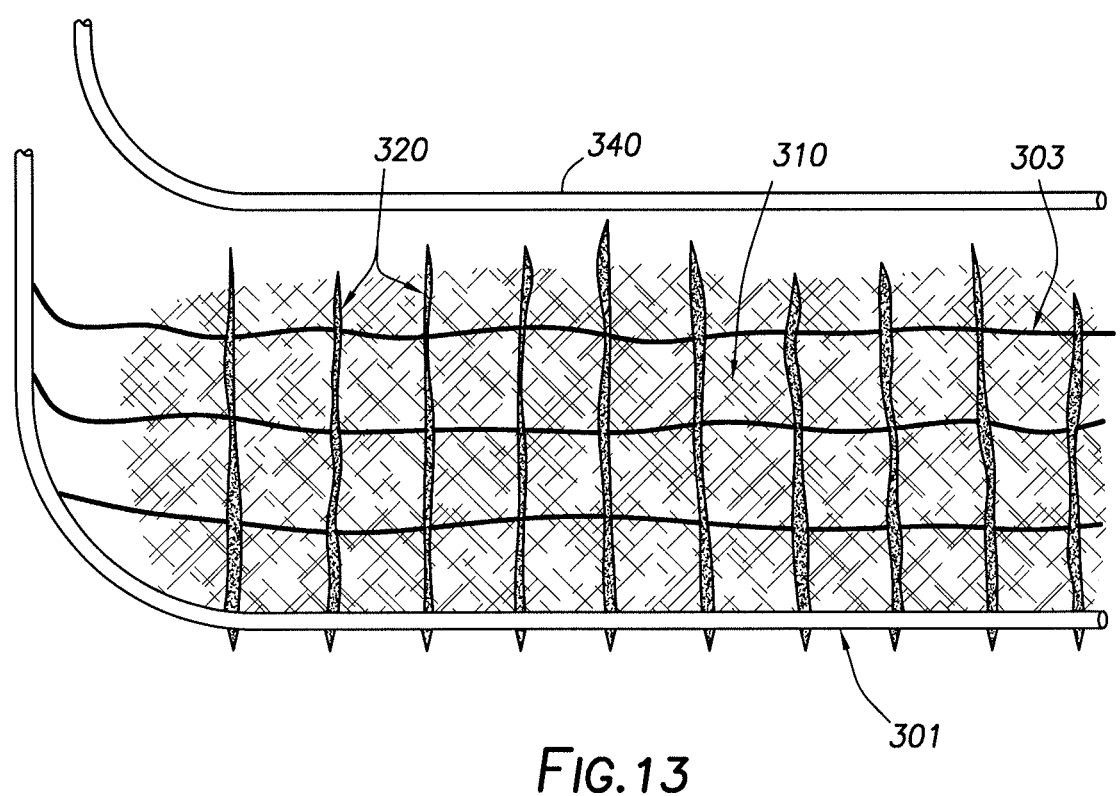

Another example of a fracture network created and/or enhanced according to certain methods of the present disclosure is illustrated in FIGS. 12-15. Referring now to FIG. 12, a portion of a subterranean formation 300 is depicted in which a main well bore 301 and secondary well bores 303 have been drilled, and a complex fracture network 310 has been formed, for example, by igniting propellant placed in the secondary boreholes 303. As shown, primary fractures 320 also have been formed to penetrate the complex fracture network 310 and connect that network to the main well bore 301. However, in this embodiment, it may not be feasible or desirable to inject a displacement fluid into the secondary boreholes 303, for example, if the region of the complex fracture network 310 has been so ruptured that the secondary boreholes 303 are no longer sufficiently conductive to allow fluid flow therethrough. As shown in FIG. 13, a separate injection well bore 340 is drilled in the subterranean formation 300 in an area adjacent to and along the length of the complex fracture network 310, and on a side of the complex fracture network 310 opposite the main well bore 301. In the embodiment shown, a single injection well bore 340 is shown directly above the complex fracture network 310. However, as a person of skill in the art will recognize with the benefit of this disclosure, multiple injection wells may be drilled near the complex fracture network, and they may be drilled at other locations proximate thereto and opposite the main well bore. In some embodiments, the injection well bore 340 optionally may be completed with casing and/or cementing (not shown), among other reasons, to increase its stability and maintain a clear flowpath for fluid therethrough.

Figure 14:
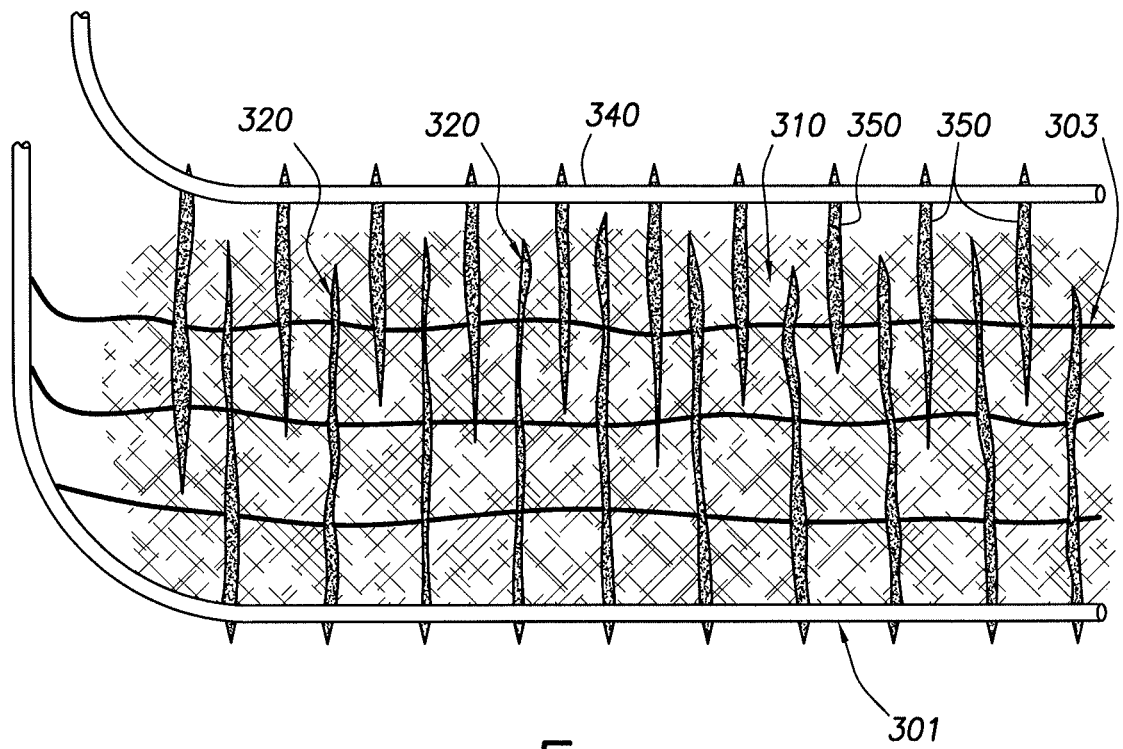

Referring now to FIG. 14, the injection well bore 340 may be perforated (not shown) and fractured, for example, by introducing a fracturing fluid into the injection well bore 340 at or above a pressure sufficient to create or enlarge fractures 350 that extend into the complex fracture network 310. In some embodiments, the fractures 350 may be formed using other techniques, including hydrojetting techniques known in the art. Alternatively, once the injection well bore 340 is perforated, an acidizing fluid may be introduced therein and allowed to acidize acid-sensitive portions of the subterranean formation adjacent to the injection well bore 340 and thereby form wormholes or other passages extending into the complex fracture network 310. If an acidizing fluid is used, diverting agents may be used, among other reasons, to help the acid sufficiently penetrate the complex fracture network 310.

In some embodiments, a portion of the injection well bore 340 may be isolated for fracturing, e.g., starting from the toe or far end of the injection well bore 340 and then moving uphole to fracture subsequent regions. In some embodiments, groups or clusters of several perforations may be formed in the injection well bore 340 and then isolated to be fractured at the same time. In some embodiments, these clusters of perforations and fractures may be closer together than fractures in a typical multi-stage fracturing job. Additionally, the fractures 350 may have a regular or irregular shape, and may extend farther from the injection well bore 340 than fractures formed in a typical production well.

In some embodiments, fluids of high and low viscosities and fluids carrying proppant and/or microproppant materials or chelating agents, acids, or delayed, in-situ acid generators may be used in the fracturing processes illustrated in FIG. 14 in a manner similar to that described above with regard to FIGS. 1-5, for similar purposes and to produce similar results. In some embodiments, the portion of the injection well bore 340 proximate to the portion of the subterranean formation 300 to be fractured also may be isolated using any known method of zonal isolation. In some embodiments, a large volume of the high viscosity fluid is introduced into the injection well bore 340, followed by intermittent or alternating introductions of a small volume of the first low viscosity fluid containing microproppant. In this embodiment, introduction of the high viscosity fluid may extend the length and height of the fractures, while introduction of the low viscosity fluid may induce the development of additional microfractures and allow for placement of microproppant in the microfractures.

Figure 15:
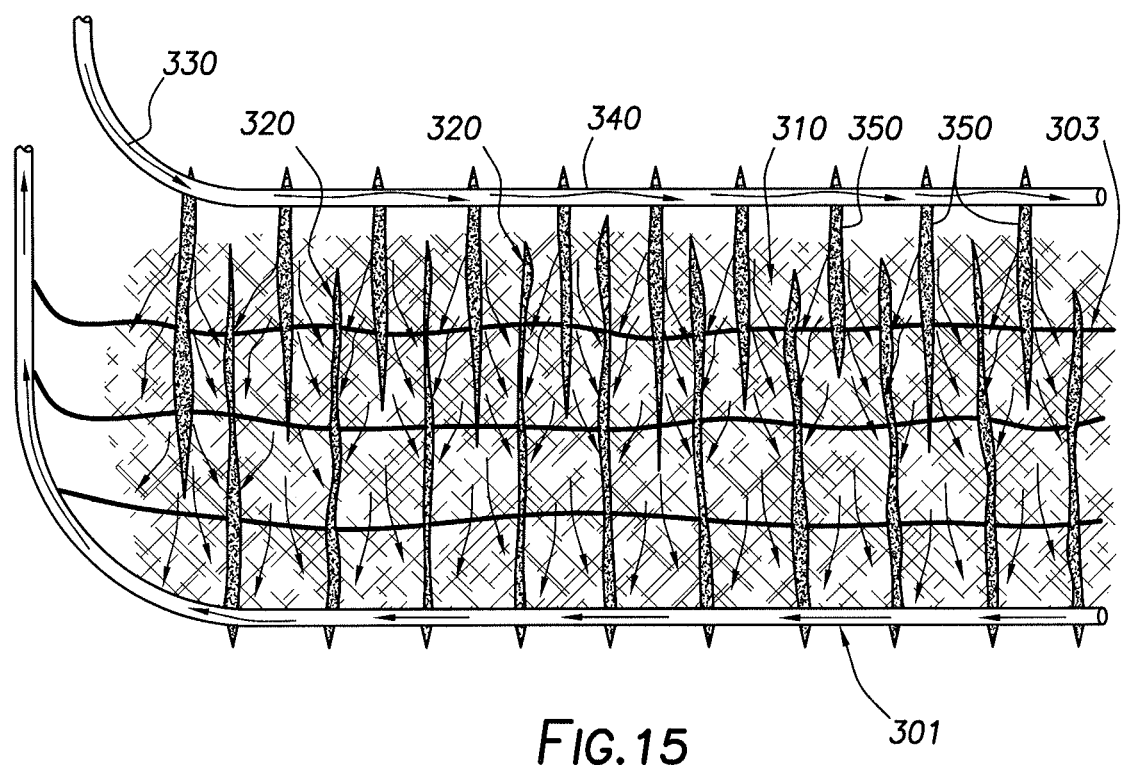

Referring now to FIG. 15, a displacement fluid 330 may be injected into the injection well bore 340 and flow into the fractures 350 that penetrate the complex fracture network 310. The displacement fluid 330 may create pressure gradients (including gravity drainage) within the complex fracture network 310 that mobilizes fluids in that region of the formation such as oil, gas, water, and the like and encourages their flow into the main well bore 301. The displacement fluid 330 may be injected at any rate sufficient to displace fluids in the matrix of the formation substantially evenly across the ruptured region of the formation. The displacement fluid 330 may be injected at any time after the injection well bore 340 has been drilled. In some embodiments, fluids such as oil or gas may have been produced out of the main well bore 301 for some period of time, and the injection well bore 340 may be drilled and/or the displacement fluid 330 may be injected at some point after the production of oil or gas has slowed or ceased. Thus, the injection of the displacement fluid may increase production of oil or gas from an already-producing well.

The treatment fluids (e.g., fracturing fluids, displacement fluids, high/low viscosity fluids) used in the methods and systems of the present disclosure may comprise any base fluid known in the art, including aqueous base fluids, non-aqueous base fluids, and any combinations thereof. The term "base fluid" refers to the major component of the fluid (as opposed to components dissolved and/or suspended therein), and does not indicate any particular condition or property of that fluids such as its mass, amount, pH, etc. Aqueous fluids that may be suitable for use in the methods and systems of the present disclosure may comprise water from any source. Such aqueous fluids may comprise fresh water, salt water (e.g., water containing one or more salts dissolved therein), brine (e.g., saturated salt water), seawater, or any combination thereof. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate. Moreover, in some embodiments, certain brine-based fluids may exhibit certain electrical conductivity properties, which may facilitate ignition of an electrically controlled propellant once placed in the secondary boreholes within the subterranean formation.

Examples of non-aqueous fluids (liquids or gases) that may be suitable for use in the methods and systems of the present disclosure include, but are not limited to, oils, hydrocarbons (e.g., liquefied natural gas (LNG), methane, etc.), organic liquids, carbon dioxide, nitrogen, and the like. In certain embodiments, the fracturing fluids, and other treatment fluids described herein may comprise a mixture of one or more fluids and/or gases, including but not limited to emulsions, foams, and the like.

In some embodiments, certain fracturing fluids or other treatment fluids used in the methods of the present disclosure may be substantially "waterless" in that they do not comprise a significant amount of water (e.g., less than 5%, 1%, or 0.1% by volume), or alternatively, any amount of water. In some embodiments, certain fracturing fluids or other treatment fluids (e.g., fluids used to place additional or secondary propellant, such as a liquid propellant) may be substantially "solids-free" in that they do not comprise a significant amount of solid material (e.g., less than 5%, 1%, or 0.1% by weight), or alternatively, any amount of solid material.

In some embodiments, a low viscosity fluid is substantially "waterless." Examples of a substantially "waterless" fluid according to the present disclosure include, but are not limited to, liquid methane, liquefied natural gas, liquid gas hydrocarbon, liquid $CO_2$, liquid $N_2$, or any combination thereof. In some embodiments, a substantially "waterless" low viscosity fluid is preferred.

In some embodiments, a fracturing fluid comprises a waterless fluid. Examples of waterless fluids that can be used as fracturing fluids according to the present disclosure include, but are not limited to, a foamed liquid gas, such as a foamed natural gas liquid, a foamed liquid gas hydrocarbon, a foamed liquid $CO_2$, a foamed liquid $N_2$, or any combination thereof. In some embodiments, a substantially "waterless" fracturing fluid is preferred.

In some embodiments, the viscosity of the treatment fluid(s) used during different portions of the methods of the present disclosure optionally may be varied, among other reasons, to provide different amounts of fluid loss control and/or leakoff that may be useful during those different steps. For example, in some embodiments, the fracturing fluid introduced at or above a pressure sufficient to create or enhance a primary fracture may be relatively viscous (e.g., about 100 cP or higher, up to about 5,000 cP), among other reasons, to minimize fluid leakoff and maintain a high bottomhole treating pressure in the formation. The higher viscosity of this fluid also may facilitate suspension of proppant particulates to be deposited in the near well bore portion of the primary fracture. Any compatible, known viscosifying agents as well as any compatible, known crosslinking agents (e.g., metal carboxylate crosslinkers) capable of crosslinking the molecules of a polymeric viscosifying agent may be used in accordance with the methods of the present disclosure.

In some embodiments, a substantially waterless fluid is viscosified with a viscosifier to transform it into a high viscosity fluid. This process minimizes leakoff during the initial introduction of the fluid for generating a primary fracture. A low viscosity fluid will enhance leakoff for generating secondary and tertiary fractures.

The displacement fluids used in the methods and systems of the present disclosure may comprise any suitable fluid known in the art, including liquids, gases, and combinations thereof. In some embodiments, the displacement fluid may comprise an aqueous base fluid mixed with one or more surfactants, which may facilitate the formation of pressure gradients in the formation and/or mobilize oil or other hydrocarbons in the formation matrix. In other embodiments, gases such as carbon dioxide, nitrogen, methane, or natural gas may be used as displacement fluids. As noted below, in some embodiments, the displacement fluids optionally may comprise additional components, including but not limited to chemical or radioactive tracers, nanoparticles, or other small-sized intelligent devices (e.g., RFID devices) that can be used to detect and/or monitor the movement of the displacement fluid.

In some embodiments, the methods of the present disclosure optionally may include additional steps or features that may optimize or enhance the effectiveness of the sweeping and flooding treatments disclosed herein. In some embodiments, the displacement fluids may be produced from the formation along with hydrocarbons and other fluids residing therein. When the produced fluids are processed at the surface, such displacement fluids may be recovered from the production stream and optionally may be re-injected into the formation as described above, among other reasons, to minimize the total volumes of fluid needed to perform the sweeping or flooding treatment. In some embodiments, the displacement fluids may be treated to remove chemical species present in the fluid before re-injecting them into the formation.

In some embodiments, the movement of the displacement fluids may be detected and/or monitored, among other ways, by including components in those fluids such as chemical or radioactive tracers, nanoparticles, or other small-sized intelligent devices (e.g., RFID devices) before they are injected into the formation. Equipment configured to detect or monitor these components may be brought to the well site and used at the surface (in conjunction with any necessary downhole equipment) to monitor and/or detect the location of those components in order to monitor the location and/or movement of the displacement fluid. In some embodiments in the secondary boreholes, injection well bores, and/or producing well bores may be equipped with various types of sensor systems, among other reasons, to detect or monitor the flow of the displacement fluid and/or reservoir fluids therein. Such sensor systems may include, but are not limited to, distributed acoustic sensing (DAS) systems, distributed temperature sensing systems (DTS), resistivity sensors, gravity sensors, pressure sensors, chemical sensors, and the like. In some embodiments, geophysical and/or well log monitoring techniques also may be used in conjunction with the methods and systems of the present disclosure, among other reasons, to monitor the formation of fractures, ignition of the propellant, and/or flow of displacement fluids and/or produced in the formation. Techniques that may be suitable for this type of monitoring include, but are not limited to, resistivity logging (e.g., borehole-to-surface resistivity, cross-well resistivity), seismic logging (e.g., cross-well seismic/DAS, borehole seismic), temperature/DTS logging, gravity logging, pulsed neutron logging, and the like.

In some embodiments, the well bores into which the displacement fluid is injected (e.g., injection well bore 340 shown in FIG. 13) may be equipped with one or more fluid control devices for controlling the flow of fluids into various regions of the formation along that well bore, among other reasons, to facilitate a more even or uniform flow of reservoir fluids toward the producing well across those regions. Such devices that may be suitable may include various types of inflow control valves and other devices known in the art, including but not limited to inflow control valves, isolation valves, interval control valves, and the like.

In certain embodiments, the treatment fluids (e.g., displacement fluids, fracturing fluids, etc.) used in the methods and systems of the present disclosure optionally may comprise any number of additional additives. Examples of such additional additives include, but are not limited to, salts, surfactants, acids, proppant particulates (e.g., frac sand), diverting agents, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, $H_2S$ scavengers, $CO_2$ scavengers, oxygen scavengers, lubricants, viscosifiers, crosslinking agents, breakers, weighting agents, relative permeability modifiers, resins, wetting agents, coating enhancement agents, filter cake removal agents, antifreeze agents (e.g., ethylene glycol), and the like. In certain embodiments, a near-well bore degradable fluid-loss control additive may be introduced into the subterranean formation to generate a new primary fracture in the same perforation cluster. In certain embodiments, a far-field degradable fluid-loss control additive may be introduced into the subterranean formation to enhance generation of the microfractures or fissures for enhancing connectivity with the complex networks created by the ignition of the propellant in the secondary boreholes. In certain embodiments, a chelating agent, an acid, and/or a delayed, in situ acid generator may be added to the low viscosity fluid. A person skilled in the art, with the benefit of this disclosure, will recognize the types of additives that may be included in the fluids of the present disclosure for a particular application.

Figure 16:
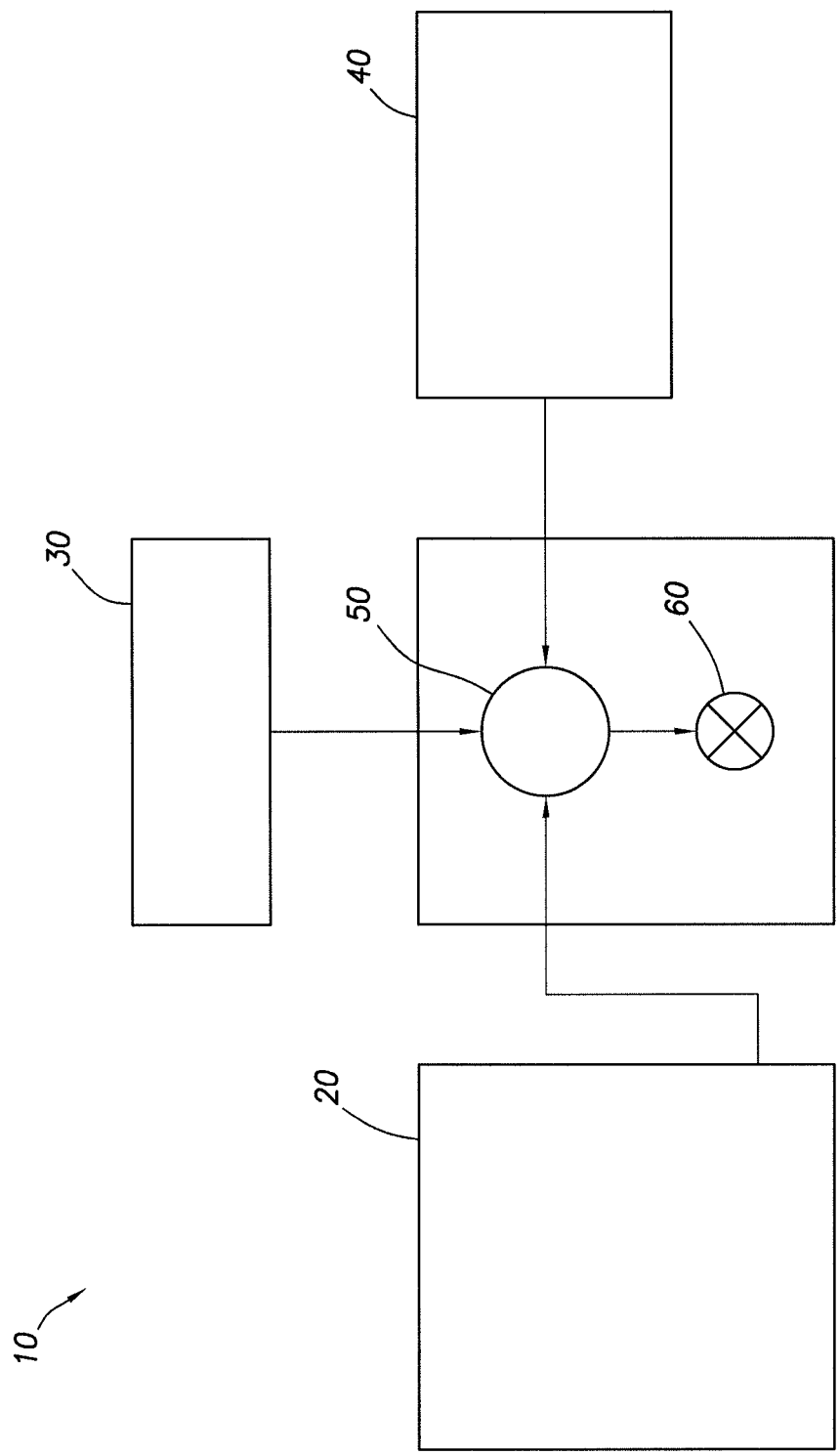
FIG. 16 is a diagram illustrating an example of a fracturing system that may be used in accordance with certain embodiments of the present disclosure.

Certain embodiments of the methods and compositions disclosed herein may directly or indirectly affect one or more components or pieces of equipment associated with the preparation, delivery, recapture, recycling, reuse, and/or disposal of the disclosed compositions. For example, and with reference to FIG. 16, the disclosed methods and compositions may directly or indirectly affect one or more components or pieces of equipment associated with an exemplary fracturing system 10, according to one or more embodiments. In certain instances, the system 10 includes a fracturing fluid producing apparatus 20, a fluid source 30, a proppant source 40, and a pump and blender system 50 and resides at the surface at a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise water, a hydrocarbon fluid, a polymer gel, foam, air, wet gases and/or other fluids.

The proppant source 40 can include a proppant for combination with the fracturing fluid. The system may also include additive source 70 that provides one or more additives (e.g., gelling agents, breaking agents, and/or other optional additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions.

The pump and blender system 50 receives the fracturing fluid and combines it with other components, including proppant from the proppant source 40 and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 can source from one, some or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just proppants at other times, and combinations of those components at yet other times.

Figure 17:
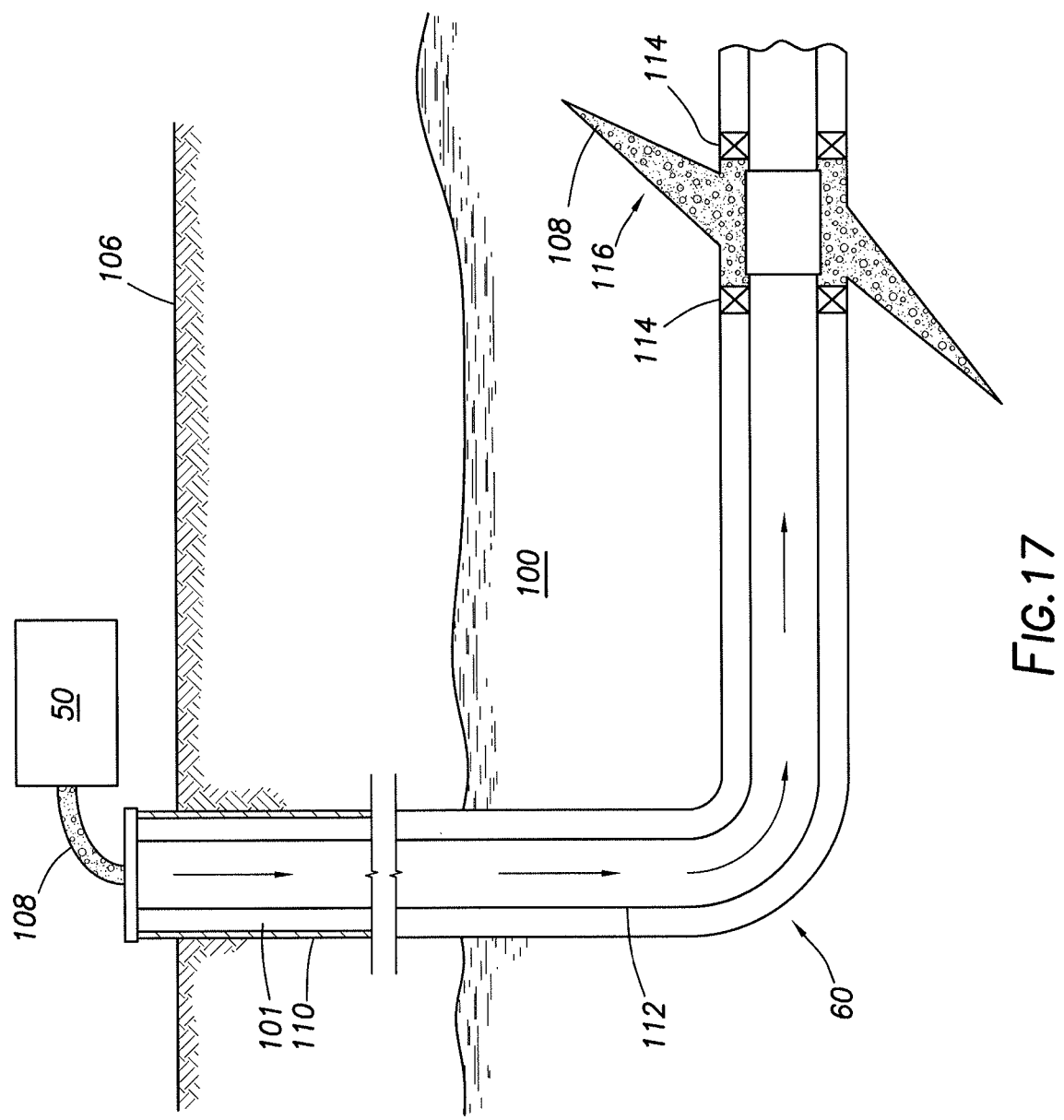
FIG. 17 is a diagram illustrating an example of a subterranean formation in which a fracturing operation may be performed in accordance with certain embodiments of the present disclosure.

FIG. 17 shows the well 60 during a fracturing operation in a portion of a subterranean formation of interest 100 surrounding a well bore 101. The well bore 101 extends from the surface 106, and the fracturing fluid 108 is applied to a portion of the subterranean formation 100 surrounding the horizontal portion of the well bore. Although shown as vertical deviating to horizontal, the well bore 101 may include horizontal, vertical, slant, curved, and other types of well bore geometries and orientations, and the fracturing treatment may be applied to a subterranean zone surrounding any portion of the well bore. The well bore 101 can include a casing 110 that is cemented or otherwise secured to the well bore wall. The well bore 101 can be uncased or include uncased sections. Perforations can be formed in the casing 110 to allow fracturing fluids and/or other materials to flow into the subterranean formation 100. In cased wells, perforations can be formed using shape charges, a perforating gun, hydro jetting and/or other tools.

The well is shown with a work string 112 depending from the surface 106 into the well bore 101. The pump and blender system 50 is coupled a work string 112 to pump the fracturing fluid 108 into the well bore 101. The working string 112 may include coiled tubing, jointed pipe, and/or other structures that allow fluid to flow into the well bore 101. The working string 112 can include flow control devices, bypass valves, ports, and or other tools or well devices that control a flow of fluid from the interior of the working string 112 into the subterranean zone 100. For example, the working string 112 may include ports adjacent the well bore wall to communicate the fracturing fluid 108 directly into the subterranean formation 100, and/or the working string 112 may include ports that are spaced apart from the well bore wall to communicate the fracturing fluid 108 into an annulus in the well bore between the working string 112 and the well bore wall.

The working string 112 and/or the well bore 101 may include one or more sets of packers 114 that seal the annulus between the working string 112 and well bore 101 to define an interval of the well bore 101 into which the fracturing fluid 108 will be pumped. FIG. 6 shows two packers 114, one defining an uphole boundary of the interval and one defining the downhole end of the interval. When the fracturing fluid 108 is introduced into well bore 101 (e.g., in FIG. 6, the area of the well bore 101 between packers 114) at a sufficient hydraulic pressure, one or more fractures 116 may be created in the subterranean zone 100. The proppant particulates in the fracturing fluid 108 may enter the fractures 116 where they may remain after the fracturing fluid flows out of the well bore. These proppant particulates may "prop" fractures 116 such that fluids may flow more freely through the fractures 116.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

An embodiment of the present disclosure is a method comprising: introducing a propellant into one or more secondary boreholes in a subterranean formation; igniting the propellant in the secondary boreholes, whereby at least a region of the subterranean formation near the secondary boreholes becomes at least partially ruptured; introducing a first fracturing fluid into a first production well bore in the subterranean formation in or near the ruptured region of the subterranean formation at or above a pressure sufficient to create or enhance at least a first primary fracture in the subterranean formation that extends into at least a portion of the ruptured region of the subterranean formation; and introducing a displacement fluid into one or more of the secondary boreholes.

Another embodiment of the present disclosure is a method comprising: introducing a propellant into one or more secondary boreholes in a subterranean formation; igniting the propellant in the secondary boreholes, whereby at least a region of the subterranean formation near the secondary borehole becomes at least partially ruptured; introducing a fracturing fluid into a production well bore in the subterranean formation near the ruptured region of the subterranean formation at or above a pressure sufficient to create or enhance at least one primary fracture in the subterranean formation that extends into at least a portion of the ruptured region of the subterranean formation; and introducing a displacement fluid into at least one injection well bore in the subterranean formation near the ruptured region of the subterranean formation, wherein the injection well further comprises one or more fractures penetrating the ruptured region of the subterranean formation.

Another embodiment of the present disclosure is a method comprising: drilling a plurality of secondary boreholes in the subterranean formation; introducing a propellant into each of the plurality of secondary boreholes; igniting the propellant in the secondary boreholes, whereby at least a region of the subterranean formation near at least one of the secondary boreholes becomes at least partially ruptured; drilling a production well bore to penetrate the subterranean formation in or near the ruptured region of the subterranean formation; introducing a fracturing fluid into a production well bore at or above a pressure sufficient to create or enhance at least one primary fracture in the subterranean formation that extends into at least a portion of the ruptured region of the subterranean formation; producing at least a first hydrocarbon-bearing fluid from the subterranean formation through the production well bore; and after producing the first hydrocarbon-bearing fluid from the subterranean formation: drilling an injection well bore to penetrate the subterranean formation near a side of the ruptured region of the subterranean formation opposite the production well bore, introducing a fracturing fluid into the injection well bore at or above a pressure sufficient to create or enhance at least one fracture in the subterranean formation that extends into at least a portion of the ruptured region of the subterranean formation, introducing a displacement fluid into the injection well bore, and producing at least a second hydrocarbon-bearing fluid from the subterranean formation through the production well bore.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
introducing a propellant into one or more secondary boreholes in a subterranean formation prior to igniting the propellant;
igniting the propellant in the one or more secondary boreholes, the ignition of the propellant occurring around a circumference and along at least a portion of the length of each of the one or more secondary boreholes to cause at least a region of the subterranean formation near the one or more secondary boreholes to become at least partially ruptured to form a complex fracture network in the ruptured region of the subterranean formation near the one or more secondary boreholes, wherein the complex fracture network comprises one or more secondary or tertiary fractures in the ruptured region of the subterranean formation;
introducing a first fracturing fluid into a first production well bore in the subterranean formation in or near the ruptured region of the subterranean formation at or above a pressure sufficient to create or enhance at least a first primary fracture in the subterranean formation that extends into at least a portion of the ruptured region of the subterranean formation; and introducing a displacement fluid into one or more of the one or more secondary boreholes.

2. The method of claim 1 further comprising allowing the displacement fluid to facilitate movement of a reservoir fluid in the ruptured region of the subterranean formation toward the first production well bore.

3. The method of claim 2 wherein the reservoir fluid comprises a hydrocarbon-bearing fluid.

4. The method of claim 1 wherein ignition of the propellant in the one or more secondary boreholes causes the ruptured region of the subterranean formation to rubblize.

5. The method of claim 4 wherein the first primary fracture is at least partially connected to the complex fracture network.

6. The method of claim 1 wherein:
at least a second production well bore penetrates the subterranean formation in or near the ruptured region of the subterranean formation; and
the method further comprises introducing a second fracturing fluid into the second production well bore at or above a pressure sufficient to create or enhance at least a second primary fracture in the subterranean formation that extends into at least a portion of the ruptured region of the subterranean formation.

7. The method of claim 6 wherein the method further comprises:
after the step of introducing the second fracturing fluid into the second production well bore, introducing a third fracturing fluid into the production well bore in the subterranean formation in or near the ruptured region of the subterranean formation at or above a pressure sufficient to create or enhance at least a third primary fracture in the subterranean formation that extends into at least a portion of the ruptured region of the subterranean formation.

8. The method of claim 7 wherein the first, second, and third fracturing fluids are introduced into the first and second production well bore using a first set of one or more pumps.

9. The method of claim 1 wherein at least one hydrocarbon-bearing fluid is produced from the subterranean formation through the first production well bore after the step of introducing the first fracturing fluid and before the step of introducing the displacement fluid into one or more of the one or more secondary boreholes.

10. The method of claim 1 wherein the propellant comprises an electrically controlled propellant.

11. The method of claim 1 wherein the displacement fluid comprises an aqueous base fluid and one or more surfactants.

12. A method comprising: introducing a propellant into one or more secondary boreholes in a subterranean formation prior to igniting the propellant; igniting the propellant in the one or more secondary boreholes, the ignition of the propellant occurring around a circumference and along at least a portion of the length of each of the one or more secondary boreholes to cause at least a region of the subterranean formation near the one or more secondary borehole to become at least partially ruptured to form a complex fracture network in the ruptured region of the subterranean formation near the one or more secondary boreholes, wherein the complex fracture network comprises one or more secondary or tertiary fractures in the ruptured region of the subterranean formation; introducing a fracturing fluid into a production well bore in the subterranean formation near the ruptured region of the subterranean formation at or above a pressure sufficient to create or enhance at least one primary fracture in the subterranean formation that extends into at least a portion of the ruptured region of the subterranean formation; and introducing a displacement fluid into at least one injection well bore in the subterranean formation near the ruptured region of the subterranean formation, wherein the injection well further comprises one or more fractures penetrating the ruptured region of the subterranean formation.

13. The method of claim 12 further comprising allowing the displacement fluid to facilitate movement of a fluid in the ruptured region of the subterranean formation toward the production well bore.

14. The method of claim 12 wherein at least one hydrocarbon-bearing fluid is produced from the subterranean formation through the production well bore after the step of introducing the fracturing fluid into the production well bore and before the step of introducing the displacement fluid into at least one injection well bore.

15. The method of claim 12 wherein the propellant comprises an electrically controlled propellant.

16. A method comprising: drilling a plurality of secondary boreholes in a subterranean formation; introducing a propellant into each of the plurality of secondary boreholes prior to igniting the propellant; igniting the propellant in the plurality of secondary boreholes, the ignition of the propellant occurring along around a circumference and along at least a portion of the length of secondary boreholes at least a region of the subterranean formation near at least one of the secondary boreholes becomes at least partially ruptured to form a complex fracture network in the region of the subterranean formation near at least one of the plurality of secondary boreholes, wherein the complex fracture network comprises one or more secondary or tertiary fractures in the ruptured region of the subterranean formation; drilling a production well bore to penetrate the subterranean formation in or near the ruptured region of the subterranean formation; introducing a fracturing fluid into a production well bore at or above a pressure sufficient to create or enhance at least one primary fracture in the subterranean formation that extends into at least a portion of the ruptured region of the subterranean formation; producing at least a first hydrocarbon-bearing fluid from the subterranean formation through the production well bore; and after producing the first hydrocarbon-bearing fluid from the subterranean formation: drilling an injection well bore to penetrate the subterranean formation near a side of the ruptured region of the subterranean formation opposite the production well bore, introducing a fracturing fluid into the injection well bore at or above a pressure sufficient to create or enhance at least one fracture in the subterranean formation that extends into at least a portion of the ruptured region of the subterranean formation, introducing a displacement fluid into the injection well bore, and producing at least a second hydrocarbon-bearing fluid from the subterranean formation through the production well bore.

17. The method of claim 16 wherein the first and second hydrocarbon-bearing fluids have substantially the same composition.

18. The method of claim 16 further comprising allowing the displacement fluid to facilitate movement of the second hydrocarbon-bearing fluid from the ruptured region of the subterranean formation toward the production well bore.

19. The method of claim 16 wherein the propellant comprises an electrically controlled propellant.

\* \* \* \* \*